US010158457B2

(12) United States Patent
Kliger et al.

(10) Patent No.: US 10,158,457 B2
(45) Date of Patent: Dec. 18, 2018

(54) COORDINATING FREQUENCY DIVISION MULTIPLEXING TRANSMISSIONS

(71) Applicant: BROADCOM CORPORATION, Irvine, CA (US)

(72) Inventors: Avraham Kliger, Ramat Gan (IL); Yitshak Ohana, Givat Zeev (IL)

(73) Assignee: Avago Technologies International Sales PTE. Limited, Singapore (SG)

( * ) Notice: Subject to any disclaimer, the term of this patent is extended or adjusted under 35 U.S.C. 154(b) by 65 days.

(21) Appl. No.: 14/957,458

(22) Filed: Dec. 2, 2015

(65) Prior Publication Data

US 2016/0156439 A1 Jun. 2, 2016

Related U.S. Application Data

(60) Provisional application No. 62/144,635, filed on Apr. 8, 2015, provisional application No. 62/086,681, filed on Dec. 2, 2014.

(51) Int. Cl.
*H04L 5/00* (2006.01)
*H04L 12/927* (2013.01)
*H04B 3/54* (2006.01)

(52) U.S. Cl.
CPC ........... *H04L 5/0007* (2013.01); *H04B 3/542* (2013.01); *H04L 5/0037* (2013.01); *H04L 47/806* (2013.01)

(58) Field of Classification Search
CPC ..................................................... H04L 5/007
See application file for complete search history.

(56) References Cited

U.S. PATENT DOCUMENTS

| | | | | |
|---|---|---|---|---|
| 7,564,803 B1 * | 7/2009 | Minei | ..................... | H04L 45/00 370/254 |
| 7,944,873 B2 * | 5/2011 | Hundscheidt | .......... | G06Q 30/04 370/310 |
| 8,406,191 B2 * | 3/2013 | Dynarski | ................ | H04L 12/66 370/331 |
| 9,270,426 B1 * | 2/2016 | Atlas | ................. | H04W 72/0466 |
| 9,325,618 B1 * | 4/2016 | Yonge, III | .............. | H04L 47/10 |
| 2002/0080816 A1 * | 6/2002 | Spinar | ................... | H04W 28/20 370/449 |
| 2003/0165118 A1 * | 9/2003 | Ota | ....................... | H04J 3/1694 370/252 |

(Continued)

*Primary Examiner* — Parth Patel
(74) *Attorney, Agent, or Firm* — Morgan, Lewis & Bockius LLP

(57) ABSTRACT

A device for coordinating frequency division multiplexing transmissions over a shared transmission medium may include a processor circuit configured to receive bandwidth requests from devices for transmissions over the shared transmission medium during a time period. A first bandwidth request may correspond to a point-to-multipoint transmission over the shared transmission medium. The processor circuit may be further configured to schedule bandwidth allocations on the shared transmission medium for the time period based at least in part on the bandwidth requests, where a first bandwidth allocation that corresponds to the first point-to-multipoint transmission is scheduled during the time period prior to other bandwidth allocations. The processor circuit may be further configured to transmit, over the shared transmission medium, an indication of the bandwidth allocations.

20 Claims, 16 Drawing Sheets

(56) References Cited

U.S. PATENT DOCUMENTS

| | | | |
|---|---|---|---|
| 2005/0135284 A1* | 6/2005 | Nanda | H04L 29/06068 370/294 |
| 2005/0213586 A1* | 9/2005 | Cyganski | H04L 41/0896 370/395.41 |
| 2005/0278389 A1* | 12/2005 | Maze | G06F 17/30206 |
| 2006/0013129 A1* | 1/2006 | Sterenson | H04L 67/322 370/229 |
| 2006/0239241 A1* | 10/2006 | Eom | H04W 28/20 370/348 |
| 2007/0030807 A1* | 2/2007 | Gummalla | H04L 12/2801 370/235 |
| 2007/0110004 A1* | 5/2007 | Liu | H04W 72/0486 370/335 |
| 2007/0116029 A1* | 5/2007 | Di Lodovico | H04L 47/14 370/442 |
| 2008/0020797 A1* | 1/2008 | Denney | H04L 12/2801 455/557 |
| 2008/0117929 A1* | 5/2008 | Kliger | H04L 1/1887 370/442 |
| 2008/0119181 A1* | 5/2008 | Suzuki | H04W 72/1268 455/422.1 |
| 2008/0192820 A1* | 8/2008 | Brooks | H04N 7/17318 375/240.02 |
| 2008/0253394 A1* | 10/2008 | Spinar | H04W 28/20 370/468 |
| 2008/0298241 A1* | 12/2008 | Ohana | H04L 12/2801 370/235 |
| 2009/0147737 A1* | 6/2009 | Tacconi | H04L 41/0896 370/329 |
| 2009/0222867 A1* | 9/2009 | Munetsugu | H04N 7/17318 725/100 |
| 2009/0303996 A1* | 12/2009 | Takase | H04L 12/1868 370/390 |
| 2010/0058099 A1* | 3/2010 | Shumarayev | H03K 19/17744 713/400 |
| 2010/0195835 A1* | 8/2010 | Nociolo | G06F 13/4022 380/287 |
| 2010/0246586 A1* | 9/2010 | Ohana | H04L 1/1874 370/400 |
| 2011/0151911 A1* | 6/2011 | Yun | H04W 72/005 455/509 |
| 2011/0176603 A1* | 7/2011 | Beeler | H04L 1/0003 375/240.02 |
| 2011/0188499 A1* | 8/2011 | Wijnands | H04L 12/56 370/390 |
| 2011/0235657 A1* | 9/2011 | Kim | H04J 3/0673 370/503 |
| 2011/0317638 A1* | 12/2011 | Cho | H04W 72/0413 370/329 |
| 2013/0128825 A1* | 5/2013 | Gallagher | H04W 28/26 370/329 |
| 2014/0348139 A1* | 11/2014 | Gomez Martinez | H04L 5/0053 370/336 |
| 2015/0003469 A1* | 1/2015 | Gomez Martinez | H04L 12/403 370/442 |
| 2016/0013922 A1* | 1/2016 | Su | H04L 49/35 370/436 |
| 2016/0094311 A1* | 3/2016 | Su | G06F 11/10 714/776 |
| 2016/0205086 A1* | 7/2016 | Zhang | H04W 12/04 726/6 |
| 2017/0026081 A1* | 1/2017 | Jung | H04L 12/403 |
| 2017/0215083 A1* | 7/2017 | Kudo | H04W 16/14 |

* cited by examiner

“Physical Layer Channel Bonding,” filed on Apr. 8, 2015; and the benefit of U.S. Provisional Patent Application Ser. No. 62/086,681, entitled "Point to Multipoint Communications," filed on Dec. 2, 2014, both of which are hereby incorporated by reference in their entireties for all purposes.

TECHNICAL FIELD

The present description relates generally to coordinating frequency division multiplexing transmissions, including coordinating orthogonal frequency division multiplexing transmissions (ODFM) and orthogonal frequency division multiple access (ODFMA) transmissions on a shared transmission medium.

BACKGROUND

Multiple different devices may share a common network infrastructure, such as a common transmission medium, in a given network environment. For example, a network environment in a dwelling unit may include multiple different devices that share one or more common network transmission media, such as one or more multimedia over coax alliance (MoCA) networks that share coaxial transmission media, one or more power-line networks that share a power-line transmission media, and the like. In the case of MoCA networks, MoCA networks utilize coaxial cables, such as television cables commonly installed in houses, to create data networks. Multiple-system operators (MSOs), which are operators of multiple cable or direct-broadcast satellite television systems, utilize MoCA devices for video distribution in the home over the common network transmission media.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
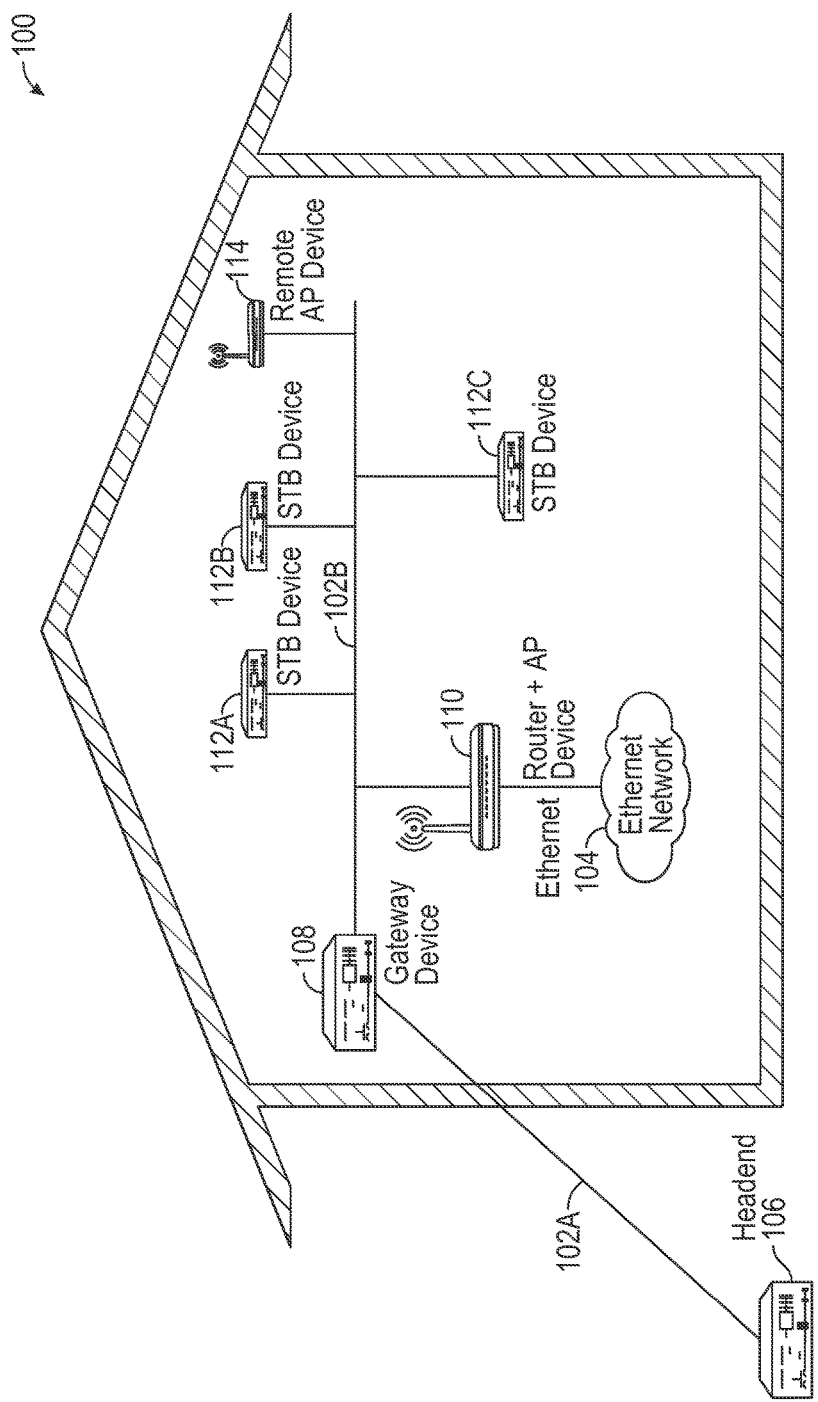
FIG. 1 illustrates an example network environment in which a system for coordinating frequency division multiplexing transmissions may be implemented in accordance with one or more implementations.

FIG. 1 illustrates an example network environment 100 in which a system for coordinating frequency division multiplexing transmissions may be implemented in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The network environment 100 includes a transmission medium 102A, a shared transmission medium 102B, a gateway device 108, one or more set-top box devices 112A-C, a router device 110, a wireless access point device 114, and a headend device 106. The devices 108, 110, 112A-C, 114 communicate with each other over the shared transmission medium 102B, and the gateway device 108 communicates with the headend device 106 over the transmission medium 102A. The router device 110 and/or the wireless access point device 114 may support WiFi transmissions, such as 8×8 multiple-input multiple-output (MIMO) transmissions with a data rate of up to, for example, 10 Gigabits per second (Gbps). One or more of the devices 106, 108, 110, 112A-C, 114 may be and/or may include all or part of the electronic system discussed below with respect to FIG. 16.

The transmission media 102A-B may include one or more of a coaxial transmission medium, a powerline transmission medium, an Ethernet transmission medium, optical transmission medium, and/or one or more devices that facilitate communications over the transmission media 102A-B, such as splitters, diplexers, switches, etc. For example, the transmission medium 102A may include an optical transmission medium and the transmission medium 102B may include a coaxial transmission medium. In one or more implementations, the router device 110 may be further coupled to another network 104, e.g. an Ethernet network.

In the network environment 100, one or more of the devices 108, 110, 112A-C, 114, such as the gateway device 108, is designated as the network coordinator (NC) for the network environment 100. For example, one or more of the devices 108, 110, 112A-C, 114 may elect, or jointly decide which device will operate as the network coordinator. The network coordinator coordinates transmissions of the devices 108, 110, 112A-C, 114 over the shared transmission medium 102B and coordinates admission of new network devices into the network environment 100. The transmissions of the devices 108, 110, 112A-C, 114 over the shared transmission medium 102B may be temporally divided into time periods or time intervals which may be referred to as medium access plan (MAP) cycles.

For example, during a current MAP cycle the devices 108, 110, 112A-C, 114 transmit bandwidth requests to the network coordinator for bandwidth allocations during the subsequent MAP cycle. The network coordinator allocates the bandwidth for the subsequent MAP cycle and transmits an indication of the bandwidth allocations to the devices 108, 110, 112A-C, 114 over the shared transmission medium 102B during the current MAP cycle. The indication of the bandwidth allocations may be transmitted by the network coordinator in a frame which may be referred to as a MAP frame. The devices 108, 110, 112A-C, 114 may then transmit data in the subsequent MAP cycle based on the bandwidth allocations indicated in the MAP frame.

The gateway device 108 is further coupled to the headend device 106 via the transmission medium 102A that is separate from the transmission medium 102B. The headend device 106 may include, for example, a video server that provides one or more audio and/or video streams to the devices 108, 110, 112A-C, 114. In the network environment 100, the gateway device 108 is in direct communication with the headend device 106, while the other devices 110, 112A-C, 114 communicate with the headend device 106 through the gateway device 108. Thus, the gateway device 108 may effectively operate as a server in the network environment 100 with respect to the other devices 110, 112A-C, 114. Similarly, the other devices 110, 112A-C, 114 may effectively operate as client devices with respect to the gateway device 108. For explanatory purposes a single gateway device 108 is illustrated in FIG. 1; however, the network environment 100 may include any number of gateway devices, each with its own set of client devices.

Thus, the gateway device 108 may operate as a single server for the network environment 100 and may be the source of most of the high speed data transmissions to the devices 110, 112A-C, 114. On the return path, the devices 110, 112A-C, 114 may transmit acknowledgements and other protocol messages back to the gateway device 108 via lower data speed transmissions. Thus, the gateway device 108 may transmit downlink point-to-multipoint OFDMA transmissions to the devices 110, 112A-C, 114 and the devices 110, 112A-C, 114 may transmit uplink multipoint-to-point OFDMA transmissions to the gateway device 108.

The OFDMA scheduling may require tight frequency and timing synchronization to achieve high performance and the OFDMA scheduling may be performed using one or more scheduling schemes. For example, a first OFDMA scheduling scheme may pre-assign sub-channels to each of the transmitting devices 112A-C such that each of the transmitting devices 112A-C receives a pre-defined allocated capacity. The assignments may be static across the MAP frames and the assignments may vary per probes. The number of symbols in an OFDMA frame may be dynamic (per OFDMA frame).

A second OFDMA scheduling scheme may dynamically assign sub-channels (or subcarriers) per OFDMA frame. The assignments may be dynamic with each OFDMA frame and set per actual bandwidth requests. Thus, per OFDMA frame the assignments of sub-channels may vary and the number of symbols is dynamic. A third OFDMA scheduling scheme may divide an OFDMA frame into sub-channels with equal capacity. The sub-channels may all be of the same size (e.g. same number of subcarriers), such as 32 subcarriers. Each of the sub-channels may have the same aggregated capacity for each of the transmitting devices 112A-C, but the capacity may vary between the transmitting devices 112A-C. Per OFDMA frame the assignments of sub-channels may vary and the number of symbols is dynamic. Thus, the scheduling schemes may assign one or more portions of each OFDMA frame, where each portion may include, for example, at least one subcarrier, at least one sub-channel, and/or at least one resource block. The OFDM and OFDMA transmissions are discussed further below with respect to FIGS. 8-14.

The devices 110, 112A-C, 114 may also transmit peer-to-peer transmissions to one another. The peer-to-peer transmissions may include two or more physical channels that are bonded, e.g. at the physical (PHY) layer. For example, the channel bonding may have a single MAC entity and underlying multiple PHY channels. The channel bonding may occur at the PCS, at the PMA sublayer, and/or at the PMD sublayer. The PCS may include the forward error correction (FEC) encoder/decoder, the scrambler and the interleaver, if any. The PMA sublayer may include the frequency response functionality and the cyclic prefix (CP)/windowing blocks. The PMD sublayer may include other time domain functionality including the up/down conversion. Channel bonding at the PCS is discussed further below with respect to FIGS. 2-3, channel bonding at the PMA sublayer is discussed further below with respect to FIGS. 4-6, and channel bonding at the PMD sublayer is discussed further below with respect to FIG. 7.

In one or more implementations, the network environment 100 may be used for Multimedia over Coax Alliance (MoCA) transmissions. In this instance, the devices 108, 110, 112A-C, 114 may support media access control (MAC) throughputs via scalable bandwidth usage with a minimum of, for example, 2.5 Gbps, and up to at least, for example, 10 Gbps between two nodes in a sixteen node network. The network environment 100 may utilize a symbol size of, for example, 5.12 microseconds, and a PHY efficiency of, for example, 90% forward error correction (FEC) and a constellation size of up to 4K-QAM. The CP size on a flat channel may be, for example, 0.5 microseconds and the MAC efficiency may be, for example, 85%. The usable bandwidth may range from, for example, 300 Megahertz (MHz) to 800 MHz. For example, a 12-bit constellation (4K-QAM) may allow a MAC rate of up to 2.5 Gbps with a usable bandwidth of approximately 300 MHz and a MAC rate of up to 4 Gbps with a usable bandwidth of up to approximately 500 MHz.

For MoCA transmissions, the bonded channels may be, for example, two bonded 400 MHz or 500 MHz channels, four or five bonded 100 MHz channels, and/or a hierarchical bonding where two sets of four or five bonded 100 MHZ channels are bonded together to achieve 800 MHz, or 1000 MHz, in total bandwidth. Each 400 MHz channel may provide, for example, 3.2 Megabits per second (Mbps) and each 100 MHz channel may provide, for example, 0.8 Mbps. Thus, bonding two 400 MHz channels or eight 100 MHz channels may provide approximately 6.4 Mbps, bonding two 500 MHz channels or ten 100 MHz channels may provide approximately 8 Gbps. Similarly three 500 MHz channels or four 400 MHz channels may provide a throughput that exceeds 10 Gbps. The bonding of four or five 100 MHz channels may provide better spectrum flexibility by allowing efficient usage of 100 MHz spectrum openings between existing services and/or existing interference over coaxial transmission medium.

The OFDM signal may apply a subcarrier spacing of about 195.3 KHz, similarly to subcarrier spacing used by MoCA 1.x or MoCA 2.x, which equals 100 MHz/512. The OFDM sampling frequency for each channel may be, for example, 400 MHz and 2048-FFT size, or equivalently four channels of 100 MHz and 512-FFT size each, and with a sampling frequency of 500 MHz, an FFT size of 2560 bins. The actual bandwidth may be scalable with the number of active subcarriers. The maximum number of used subcarriers may be 2016 with eight unused subcarriers around the center frequency and twelve unused at each edge (2.5 MHz). This may result in an actual used bandwidth of up to 394 MHz, with an ideal supported throughput of 3.2 Gbps and 2.2 Gbps with 95% home coverage. Thus, the bonded channels may support up to 6.5 Gbps with ideal flat channels, and/or 4.6 Gbps with 95% home coverage.

In MoCA implementations, channel bonding can be performed between any two existing and/or newly defined MoCA bands, such as bands D and E, bands B and D, bands E and F, etc. Band D may have available bandwidth up to 550 MHz which may provide throughput of up to 3.2 Gbps with a single channel and/or up to 4.5 Gbps with two channels. Band E may have available bandwidth of up to 300 MHz which may provide throughput of up to 2.5 Gpbs with a single channel. Combining bands E and F may have available bandwidth of up to 475 MHz which may provide throughput of up to 3.2 Gbps with a single channel and/or up to 4.2 Gbps with two channels. Combining bands D and F may provide throughput of up to 5 Gbps with two channels and combining bands D and E may provide throughput of up to 5.7 Gbps with two channels. Bands D through F are described for explanatory purposes; however, one or more other bands may also be used. Similarly, two bonded channels are described for explanatory purposes, but any number of channels may be bonded together.

Figure 2:
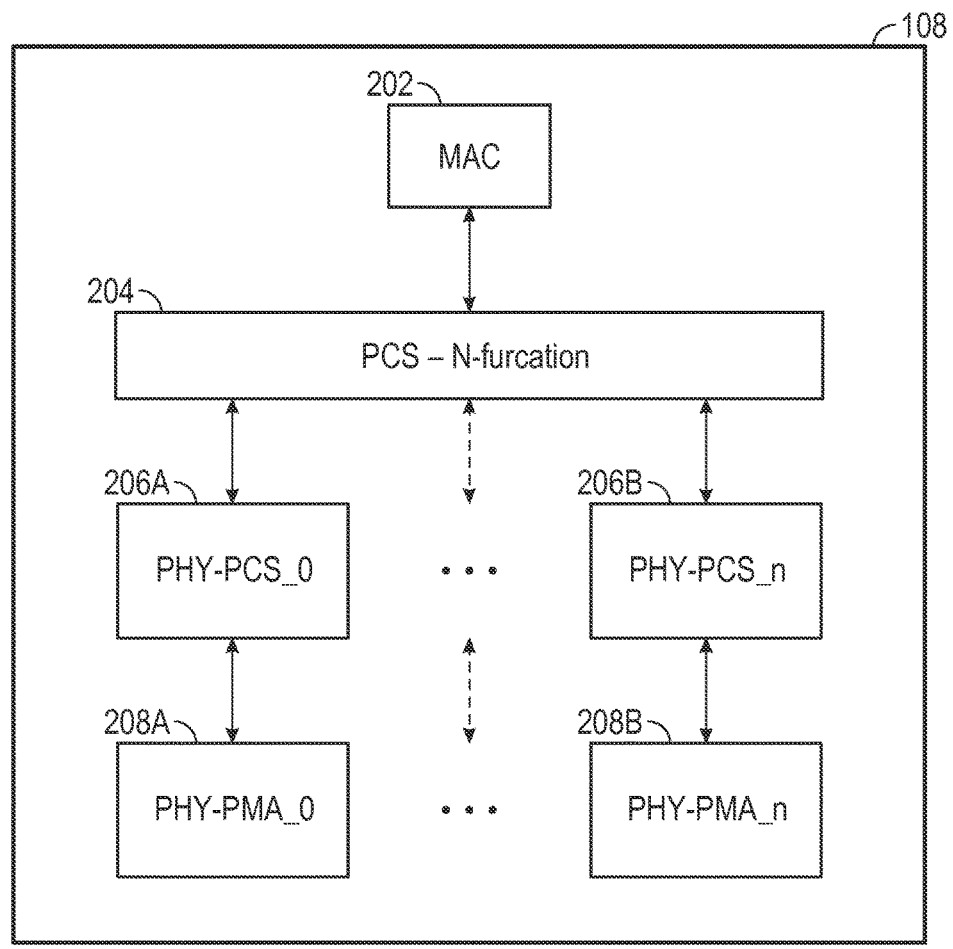
FIG. 2 illustrates an example gateway device that may implement channel bonding at a physical coding sublayer (PCS) in accordance with one or more implementations.

FIG. 2 illustrates an example gateway device 108 that may implement channel bonding at a physical coding sublayer (PCS) in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided. For explanatory purposes, the gateway device 108 is illustrated in FIG. 2. However, one or more of the components of the gateway device 108 illustrated in FIG. 2 may also be included in one or more of the other devices 106, 110, 112A-C, 114.

The gateway device 108 includes a media access control (MAC) module 202, a PCS N-furcation module 204, multiple PCS modules 206A-B, and multiple PMA modules 208A-B. Thus, the gateway device 108 includes one MAC module 202 and multiple bonded physical channels (formed through PCS modules 206A-B and PMA modules 208A-B). In FIG. 2, the channel bonding is performed at the PCS based at least in part on PCS and PMA parameters that vary between channels, such as FEC codeword size and rate, FFT size, cyclic prefix, modulation order, and/or generally any PCS and/or PMA parameters. The N-furcation of data by the PCS N-furcation module 204 between the physical channels may be performed on a symbol-by-symbol basis using a round-robin technique to rotate between the PCS modules 206A-B. Thus, the PCS N-furcation module 204 divides the data bits of each burst data between the PCS modules 206A-B based at least in part on the corresponding PHY symbol capacity. For explanatory purposes, the PCS N-furcation module 204 is illustrated as a bifurcation module; however, N of the PCS N-furcation module 204 may be, for example, any value greater than 1.

For example, for a given a payload data size of M bytes with $N_{bits,i}$ being the total number of bits that can be transmitted in one symbol of a PHY channel (i), and $FEC_{rate,i}$ being the FEC rate use by a PHY channel (i), the number of data bits that can be transmitted in each channel, Mbits,i, may be calculated as Mbits,i=Nbits,i*FECrate,i. The fraction of the M bytes transmitted in each channel, Fbits,i, may be calculated as Fbits,i=Mbits,i/sum(Mbits,0 . . . Mbits,n). The total number of bytes out of the M bytes that are transmitted in each symbol on each channel may be calculated as Si=CEILING(Mbits,i, 8), and the total number of bytes out of the M bytes that are transmitted on each channel may be calculated as $M_i$=CEILING($F_{bits,i}$*M, 1), where the sum of $M_i$ of can be higher than the M by a maximum of the total number of channels. These calculations may be symmetrical for both transmitter and receiver devices.

In one or more implementations, one or more of the MAC module 202, the PCS N-furcation module 204, the PCS modules 206A-B, the PMA modules 208A-B, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
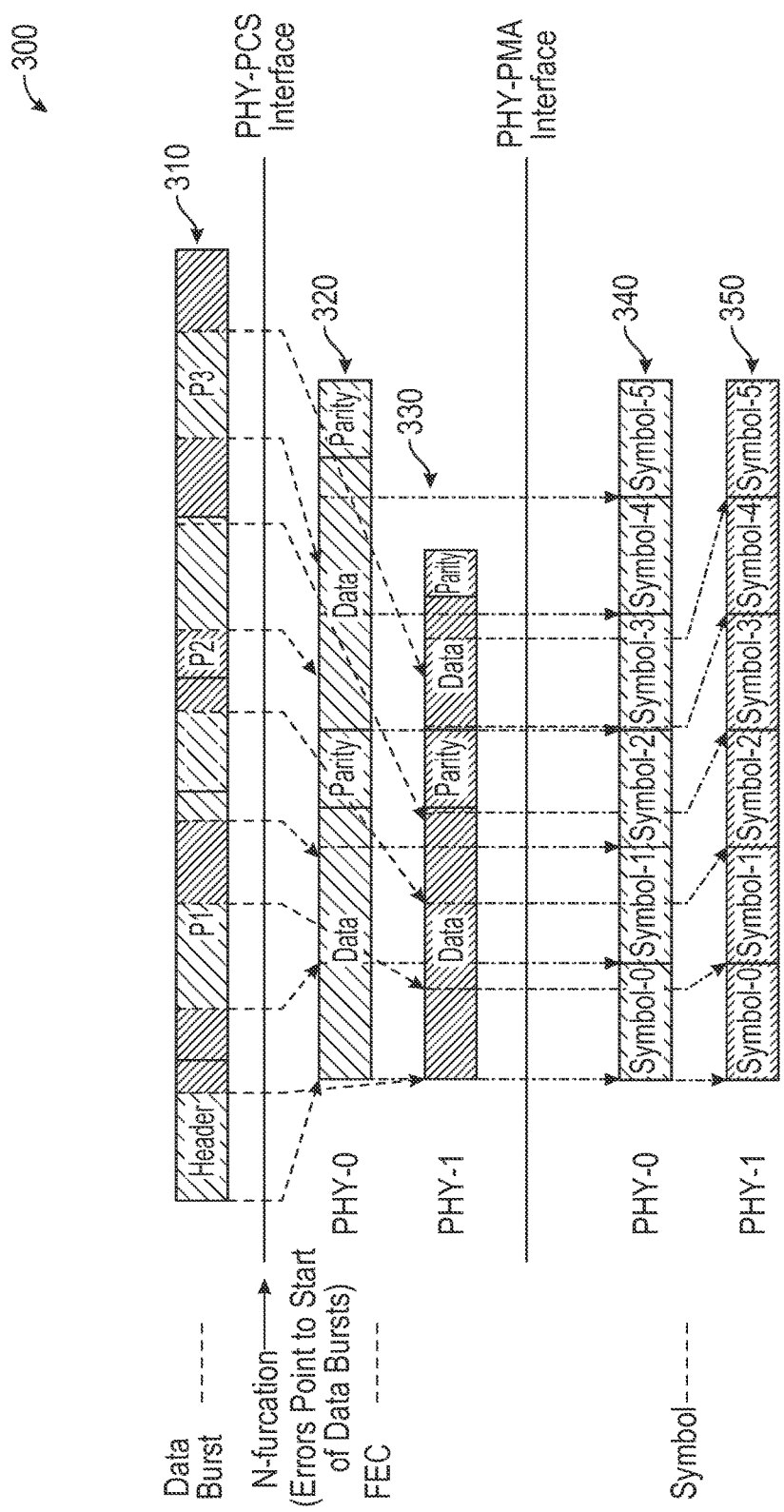
FIG. 3 illustrates an example data N-furcation for PCS channel bonding in accordance with one or more implementations.

FIG. 3 illustrates an example data N-furcation 300 for PCS channel bonding in accordance with one or more implementations. In the example data N-furcation 300, data bits of a data burst 310 are divided to the two separate physical channels (PHY-0, PHY-1) and passed to the FEC encoders to generate streams of FEC codewords (e.g. data and parity bits) 320, 330. The FEC codewords 320, 330 are then separated into streams of symbols 340, 350 for the two separate physical channels. In the example data N-furcation 300, the PMAs are synchronized in time, with all symbols having the same duration, but PHY-0 having a lower capacity than PHY-1. For explanatory purposes, the data N-furcation 300 is illustrated as a data bifurcation; however, N of the data N-furcation 300 may be, for example, any value greater than 1.

Figure 4:
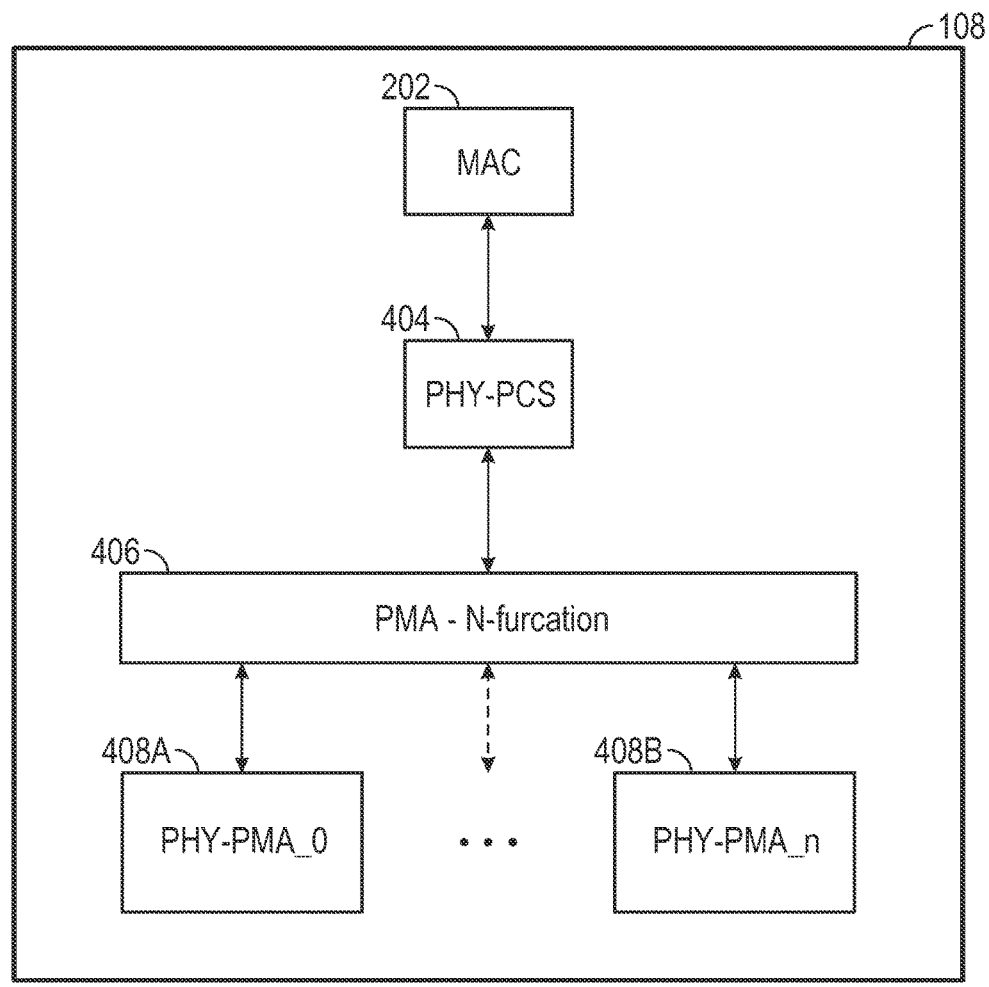
FIG. 4 illustrates an example gateway device that may implement channel bonding at a physical medium attachment (PMA) sublayer in accordance with one or more implementations.

FIG. 4 illustrates an example gateway device 108 that may implement channel bonding at a physical medium attachment (PMA) sublayer in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided. For explanatory purposes, the gateway device 108 is illustrated in FIG. 4. However, one or more of the components of the gateway device 108 illustrated in FIG. 4 may also be included in one or more of the other devices 106, 110, 112A-C, 114.

The gateway device 108 includes a MAC module 202, a PCS module 404, a PMA N-furcation module 406, and multiple PMA modules 408A-B. Thus, the gateway device 108 includes one PCS module 404 and multiple bonded PMA modules 408A-B. The gateway device 108 may include common encoders/decoders for the PMA module 408A-B that utilize the same codeword sizes and rates. The PCS module 404 may be aware of the symbol capacity of each of the underlying PMA modules 408A-B. Each of the PMA modules 408A-B may have its own values for one or more of the following parameters: FFT size, CP and window size, and/or bitloading per subcarrier. In the instance that the FFT size, CP, and window size are the same for all of the PMA modules 408A-B, the PMA modules 408A-B can be synchronized in time to reduce implementation complexity. For example, there may be no need for filtering between different PMA modules 408A-B since they may all be synchronized.

The N-furcation of data by the PMA N-furcation module 406 between the physical channels may be performed on a symbol-by-symbol basis using a round-robin technique to rotate between the PMA modules 408A-B. Thus, the PMA N-furcation module 406 divides the symbols of each burst data between the PMA modules 408A-B based at least in part on the corresponding PHY symbol capacity, e.g. to provide the exact number of bits equal to the PHY symbol capacity. The PHY symbol capacity of each channel may be determined, for example, as discussed above with respect to FIG. 2. For explanatory purposes, the PMA N-furcation module 406 is illustrated as a bifurcation module; however, N of the PMA N-furcation module 406 may be, for example, any value greater than 1.

In one or more implementations, one or more of the MAC module 202, the PCS module 404, the PMA N-furcation module 406, the PMA modules 408A-B, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 5:
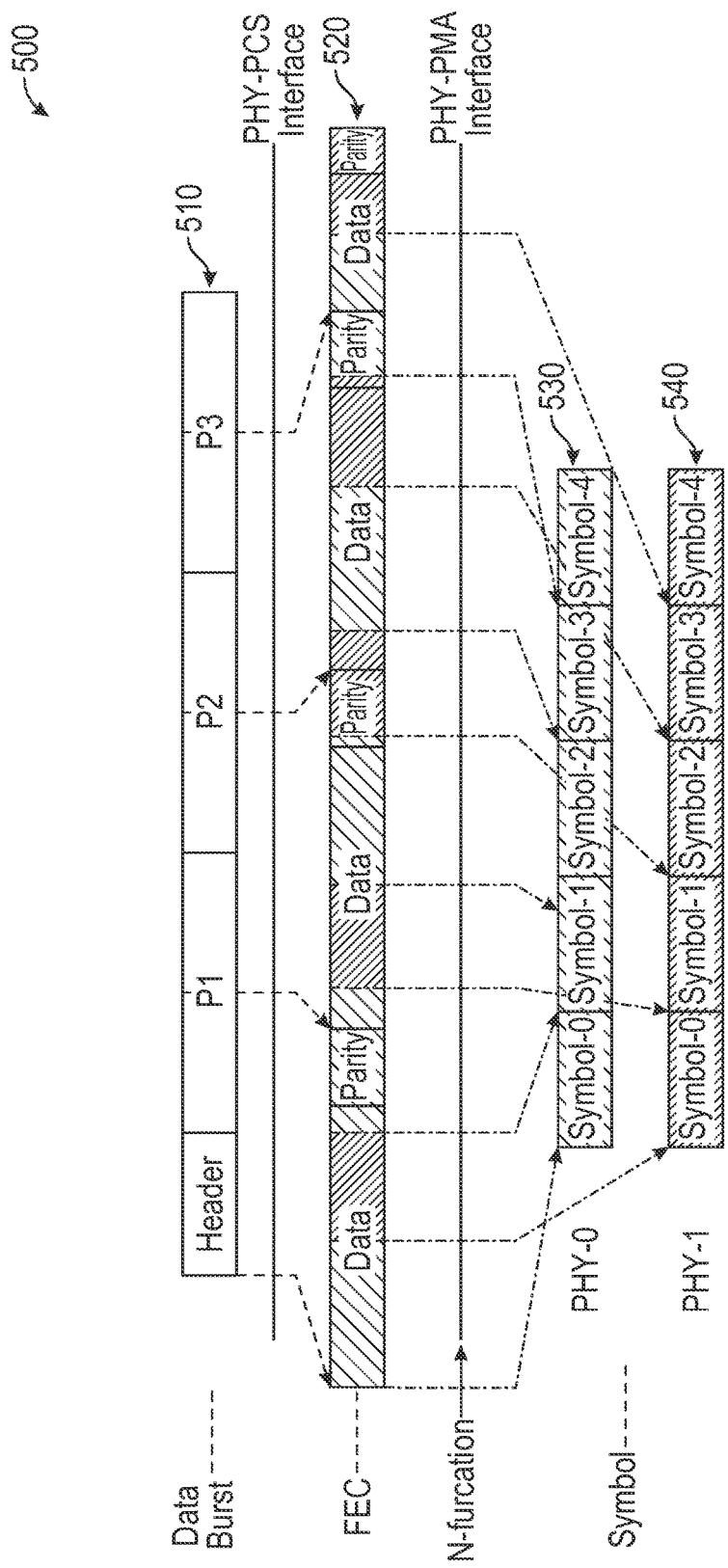
FIG. 5 illustrates an example data N-furcation for PMA sublayer channel bonding in accordance with one or more implementations.

FIG. 5 illustrates an example data N-furcation 500 for PMA sublayer channel bonding in accordance with one or more implementations. In the example data N-furcation 500, data bits of a data burst 510 are passed to the FEC encoder to generate a stream of FEC codewords (e.g. data and parity bits) 520. The FEC codewords 520 are separated into two separate streams of symbols 530, 540, for the two separate physical channels (PHY-0, PHY-1). In the example data N-furcation 500, the PMAs are synchronized in time, with all symbols having the same duration, but PHY-0 having a lower capacity than PHY-1. For explanatory purposes, the data N-furcation 500 is illustrated as a data bifurcation; however, N of the data N-furcation 500 may be, for example, any value greater than 1.

Figure 6:
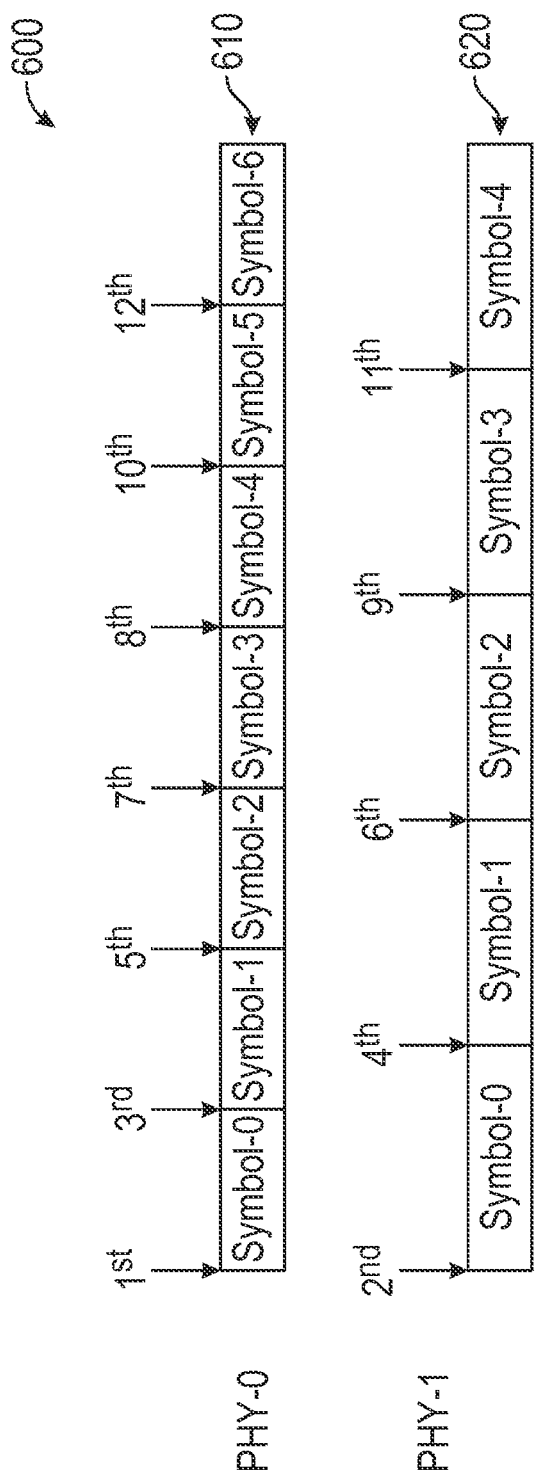
FIG. 6 illustrates an example data N-furcation for PMA sublayer channel bonding with unequal symbol sizes in accordance with one or more implementations.

FIG. 6 illustrates an example data N-furcation 600 for PMA sublayer channel bonding with unequal symbols sizes in accordance with one or more implementations. The example data N-furcation 600 includes symbol streams 610, 620 corresponding to the two bonded physical channels (PHY-0 PHY-1). The symbol size of the symbols in the symbol stream 610 is smaller than the symbol size of the symbols in the symbol stream 620, and therefore the N-furcation ordering is as shown in FIG. 6. Thus, the PMAs 408A-B have different PHY durations and are not synchronized in time. If the start of the symbols of multiple PMA modules 408A-B is the same, the PCS module 404 may write data to these symbols in an increasing order of their PMA indices. This scheme may also apply to bonding at the PCS level, e.g. as discussed above with respect to FIGS. 2 and 3. For explanatory purposes, the data N-furcation 600 is illustrated as a data bifurcation; however, N of the data N-furcation 600 may be, for example, any value greater than 1.

Figure 7:
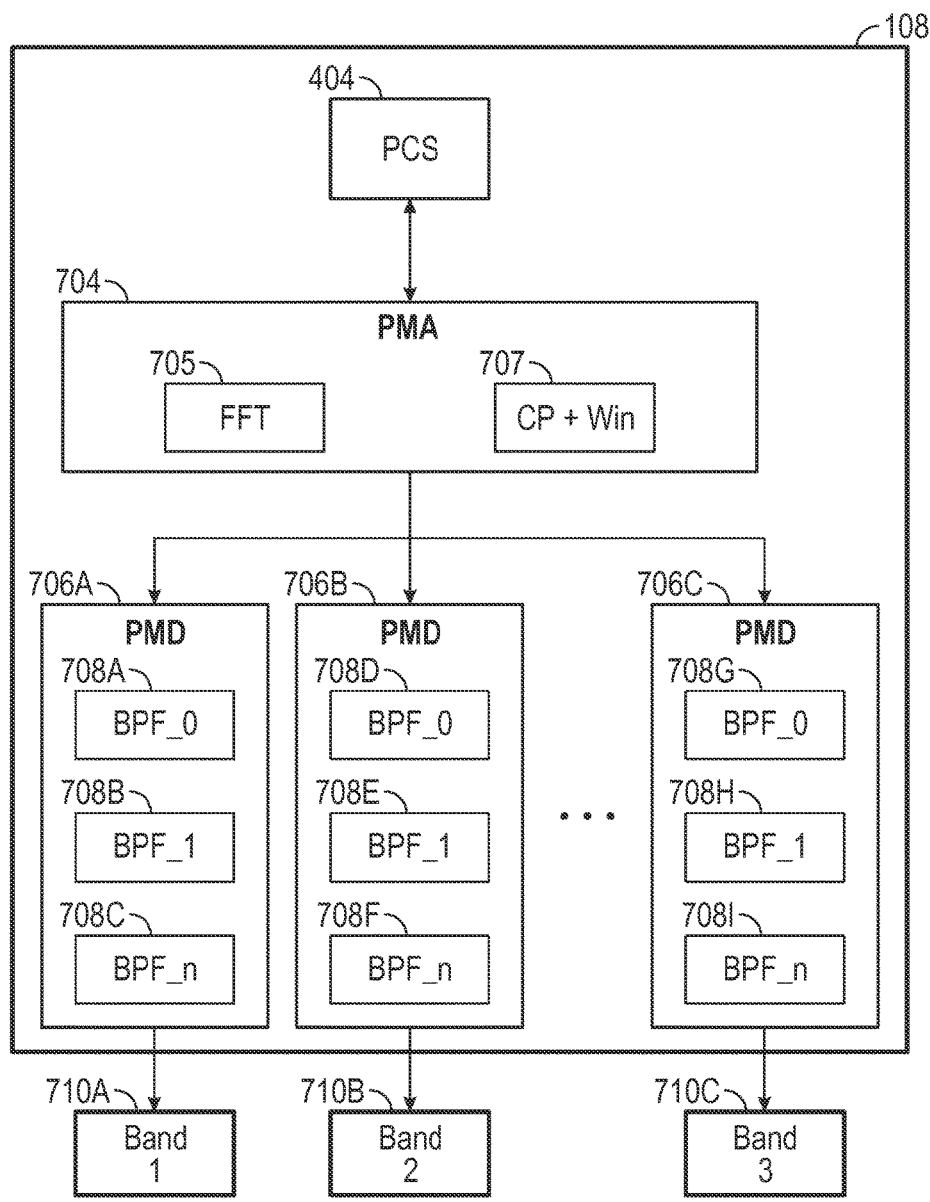
FIG. 7 illustrates an example gateway device that may implement channel bonding at a physical medium dependent (PMD) sublayer in accordance with one or more implementations.

FIG. 7 illustrates an example gateway device 108 that may implement channel bonding at a physical medium dependent (PMD) sublayer in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided. For explanatory purposes, the gateway device 108 is illustrated in FIG. 7. However, one or more of the components of the gateway device 108 illustrated in FIG. 7 may also be included in one or more of the other devices 106, 110, 112A-C, 114.

The gateway device 108 includes a PCS module 404, a PMA module 704, and multiple PMD modules 706A-C. The PMA module 704 includes an FFT module 705 and a CP/windowing module 707. Although the PMA module 704 includes a single FFT module 705, the FFT module 705 may be built from multiple FFT cores. The PMD module 706A includes band pass filter (BPF) modules 708A-C, the PMD module 706B includes BPF modules 708D-F, and the PMD module 706C includes BPF modules 708G-I. The PMD module 706A may transmit on band 710A, such as band E, the PMD module 706B may transmit on band 710B, such as band F, and the PMD module 706C may transmit on band 710C, such as band D.

The N-furcation of an OFDM symbol by the PMA module 704 between the PMD physical channels may be divided according to the bandwidth capacity of each PMD channel. For explanatory purposes, the N-furcation of the OFDM symbol by the PMA module 704 is illustrated with N being equal to 3; however, N of the N-furcation by the PMA module 704 may be, for example, any value greater than 1.

In one or more implementations, one or more of the PCS module 404, the PMA module 704, the FFT module 705, the CP/windowing module 707, the PMD modules 706A-C, the BPF modules 708A-I, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 8:
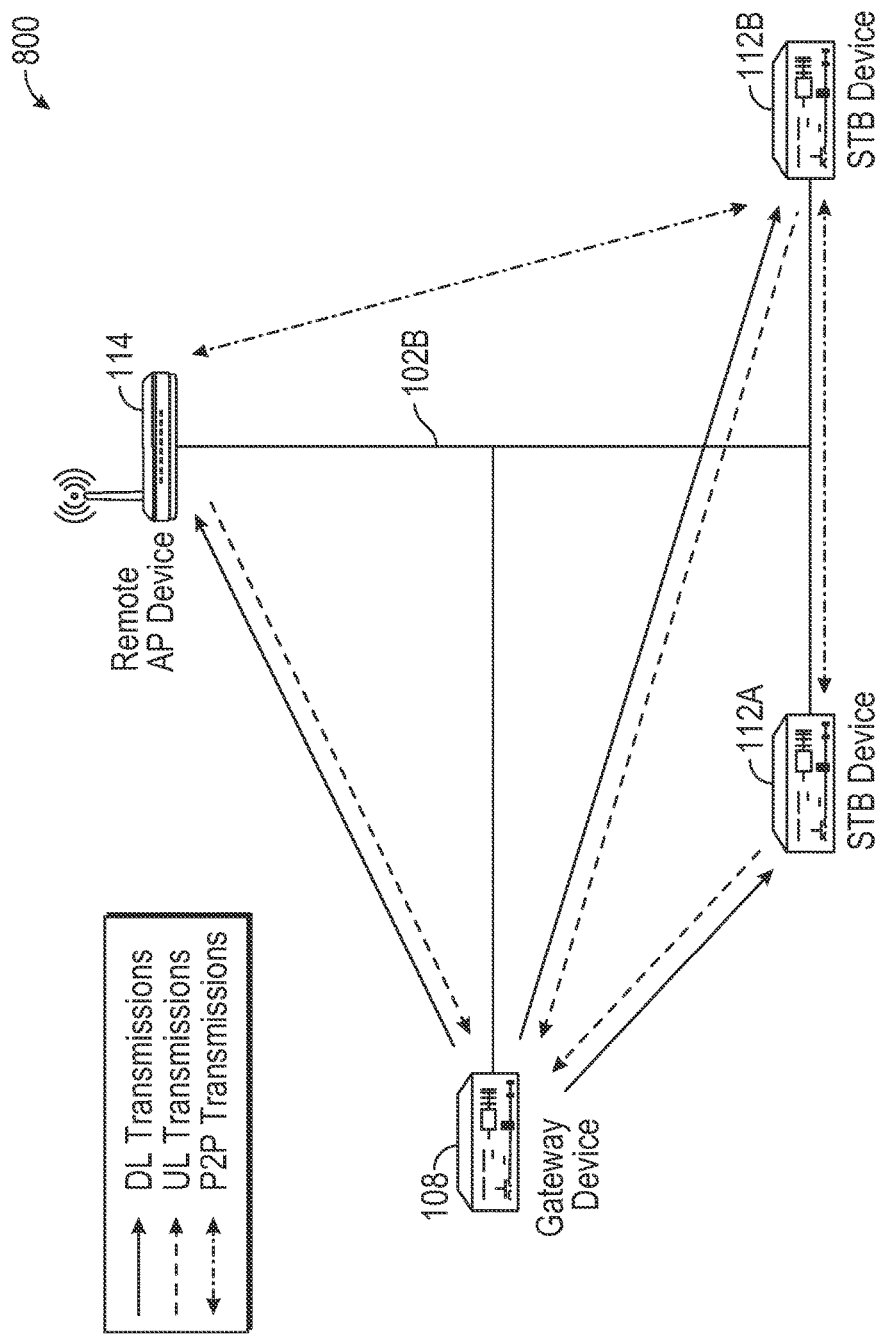
FIG. 8 illustrates an example network environment in which a system for coordinating frequency division multiplexing transmissions may be implemented in accordance with one or more implementations.

FIG. 8 illustrates an example network environment 800 in which a system for coordinating frequency division multiplexing transmissions may be implemented in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The example network environment 800 includes the gateway device 108, the shared transmission medium 102B, and the devices 112A-B, 114. As discussed above with respect to FIG. 1, the gateway device 108 and the devices 112A-B, 114 may operate in a client/server topology in which high data rate downlink single point-to-multipoint transmissions are transmitted from the gateway device 108 (e.g. server devices) to the devices 112A-B, 114 (e.g. client devices), and lower data rate and/or smaller packet uplink transmissions are transmitted from the devices 112A-B, 114 to the gateway device 108. Furthermore, peer-to-peer transmissions may be transmitted between any two of the devices 112A-B, 114. Example map cycle schedules for the downlink transmissions, uplink transmissions, and peer-to-peer transmissions are discussed further below with respect to FIG. 9.

The downlink single point-to-multipoint transmissions may be OFDM and/or OFDMA bursts. An OFDM burst may include 1-2 pilot symbols for channel estimation and J data symbols across N subcarriers. The pilot symbols may be carried on every n-th subcarrier, where n equals, for example, 1, 2, 4, 8, etc. Thus, a receiver device may store channel estimation information from all transmitter devices. The pilot symbols may be used for initial phase and frequency estimations per received OFDM/A frame. The pilot symbols may be used for channel estimation or channel estimation corrections. The number of data symbols J may be set per the received reservation requests for the MAP cycle. Larger frames may reduce pilot symbols overhead, thereby improving throughput efficiency. The data symbols may, in some instances, require data aggregation and per frame subcarriers may be used by a single transmitting device. An example downlink OFDMA burst is discussed further below with respect to FIG. 12.

The uplink transmissions may be OFDMA bursts that include one or more OFDMA frames. An OFDMA frame includes one or more resource blocks (RBs). The number of resource blocks in an OFDMA frame may be fixed. A resource block may have a fixed number of subcarriers (X). The number of symbols in an OFDMA frame can vary from 1 to J. All resource blocks occupy the X subcarriers over the OFDMA frame J symbols. Thus, each resource block may contain up to X*J resource elements (RE), which may be an IQ-symbol per subcarrier per symbol. A resource element can be a data resource element or a pilot. The number of pilots in a resource block is designated as P, and the number of data resource elements is designated as D. Each resource block may be dedicated to a particular transmitter device, while different resource blocks in an OFDMA frame can be used by different transmitters, for example up to 16 transmitter per OFDMA frame.

Figure 9:
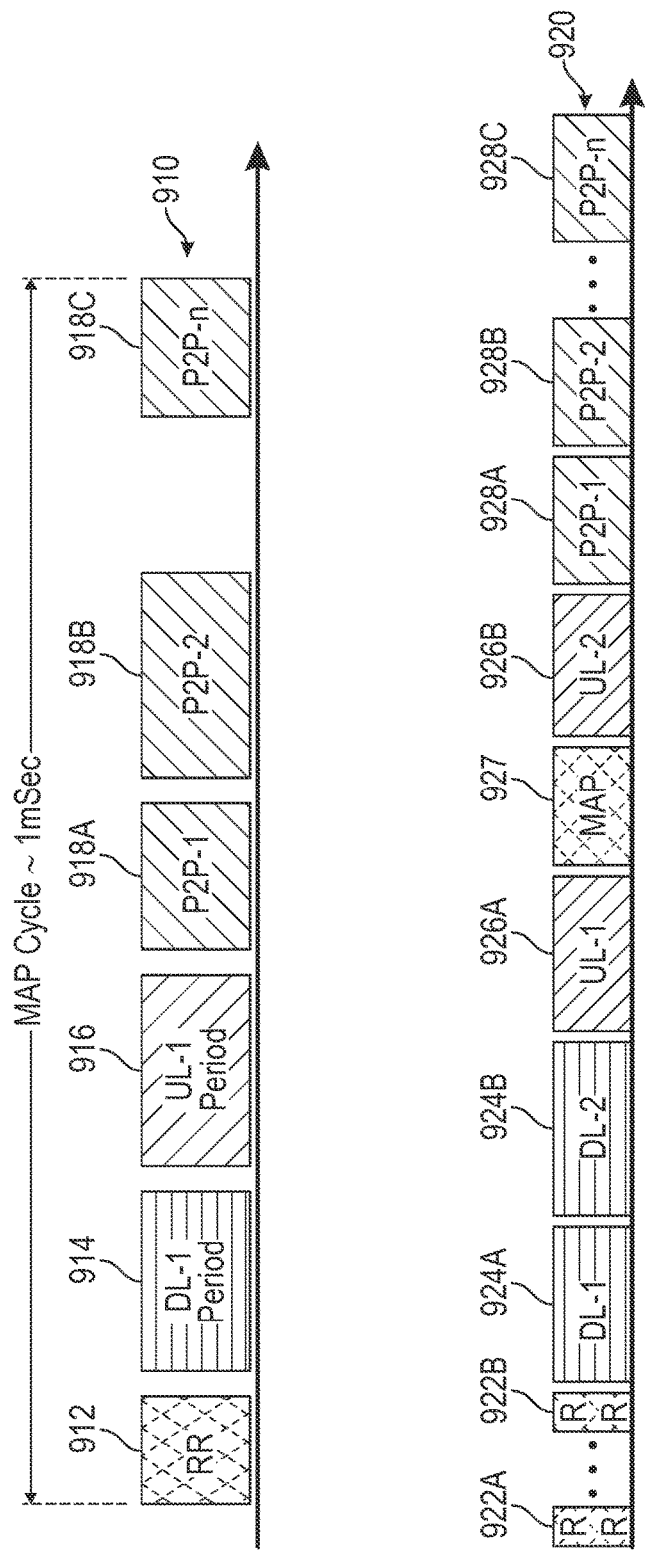
FIG. 9 illustrates example map cycle schedules in accordance with one or more implementations.

FIG. 9 illustrates example map cycle schedules 910, 920 in accordance with one or more implementations. For explanatory purposes, the example map cycle schedules 910, 920 are discussed with reference to the network environment 800 of FIG. 8. However, the example map cycle schedules 910, 920 are not limited to the network environment 800 of FIG. 8 and may apply to other network environments, such as the network environment 100 of FIG. 1.

The example map cycle schedule 910 is for a network environment including a single gateway device 108, such as the network environment 800, while the example map cycle schedule 920 is for a network environment including two gateway devices. However, the example map cycle schedule 920 may also be used in a network environment with a single gateway device 108, such as the network environment 800, with the transmission periods allocated to the second gateway device being removed.

The example map cycle schedule 910 includes a reservation request transmission period 912 when the devices 108, 112A-B, 114 may request bandwidth allocations from the network coordinator for a subsequent MAP cycle, a downlink transmission period 914, e.g. for single point-to-multipoint transmissions from the gateway device 108 to the devices 112A-B, 114, an uplink transmission period 916, e.g. for transmissions from the devices 112A-B, 114 to the gateway device 108, and peer-to-peer transmission periods 918A-C, e.g. for transmissions between any two of the devices 112A-B, 114. In one or more implementations, one or more of the transmission periods 914, 916, 918A-C may be scheduled dynamically on an on-demand basis. Thus, some map cycles may not include one or more of the transmission periods 914, 916, 918A-C. The example map cycle schedule 910 may also include a MAP frame transmission period (not shown) during which the network coordinator, such as the gateway device 108, transmits a MAP frame that includes the bandwidth allocations for the subsequent MAP cycle.

The example map cycle schedule 920 includes reservation request periods 922A-B, downlink transmission periods 924A-B, uplink transmission periods 926A-B, a MAP frame transmission period 927, and one or more peer-to-peer transmission periods 928A-C. In one or more implementations, one or more of the transmission periods 924A-B, 926A-B, 928A-B may be scheduled dynamically on an on-demand basis. Thus, some map cycles may not include one or more of the periods transmission periods 924A-B, 926A-B, 928A-B.

Figure 10:
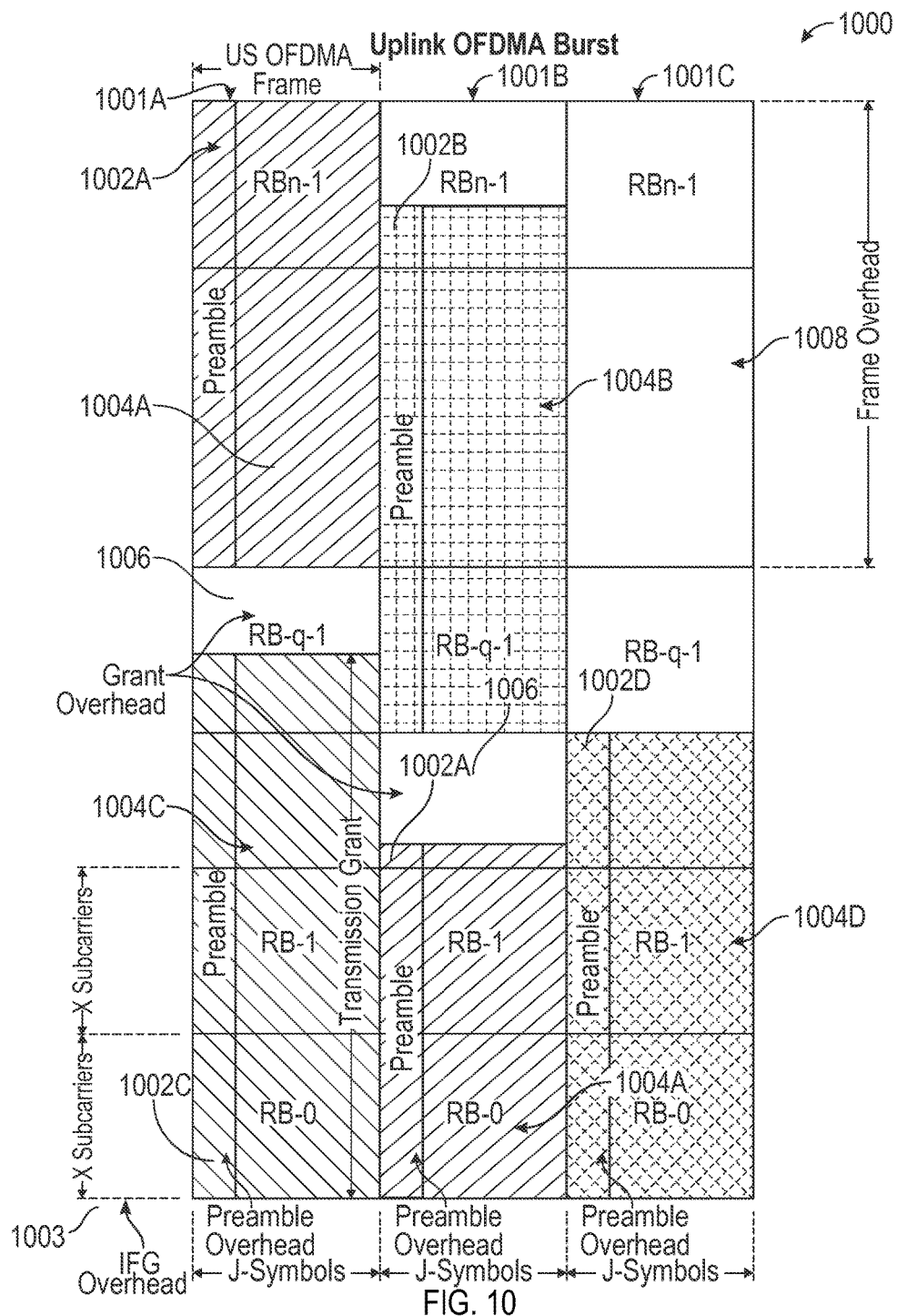
FIG. 10 illustrates an example uplink OFDMA burst with a fixed OFDMA frame size in accordance with one or more implementations.

FIG. 10 illustrates an example uplink OFDMA burst 1000 with a fixed OFDMA frame size in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The example uplink OFDMA burst 1000 with a fixed OFDMA frame size includes one or more OFDMA frames 1001A-C, with a maximum duration of the OFDMA burst being, for example, 400 microseconds. Each of the OFDMA frames 1001A-C includes J OFDMA symbols and the number of subcarriers in each of the OFDMA frames 1001A-C equals the number of usable subcarriers (N) in an OFDMA symbol, such as, for example, 128 to 2048 subcarriers. The OFDMA frames 1001A-C are each divided into resource blocks in the frequency domain with each resource block having X subcarriers and Q symbols. Each resource block may be used by one transmitter device, such as one of the devices 112A-C, 110, 114. Each resource block may include a number of resource elements, e.g. data resource elements and/or pilot resource elements. The first symbol of each resource block may be a preamble symbol that only includes pilot resource elements.

One or more of the devices 112A-C, 110, 114 that receive data grants are allocated resource blocks to transmit their data. A resource block may only be allocated to a single transmission burst. The resource blocks allocated per grant may be referred to as transmission grants. Thus, the example uplink OFDMA burst 1000 includes four transmission grants 1004A-D that each includes preamble symbols 1002A-D. For example, the transmission grant 1004A may be allocated to the device 112A, the transmission grant 1004B may be allocated to the device 112B, the transmission grant 1004C may be allocated to the device 112C, and the transmission grant 1004D may be allocated to the device 114.

The example uplink OFDMA burst 1000 may also include overhead, such as interframe gap (IFG) overhead 1003, grant overhead 1006, frame overhead 1008, and overhead associated with the preambles 1002A-D. The IFG overhead 1003 occurs once each uplink OFDMA burst 1000. The overhead associated with the preambles 1002A-D occurs on every OFDMA frame 1001A-C. The grant overhead 1006 occurs on every grant, which on average equals X/2 subcarriers over the number of symbols (J) in each of the frames 1001A-C. The frame overhead 1008 occurs once every uplink OFDMA burst 1000, which on average equals half of the OFDMA frame size.

Thus, the overhead (in microseconds) per uplink OFDMA burst 1000 can be calculated using the symbol size (Tsym), the number of transmitting devices per OFDMA frame (n), the preamble duration (Tpre), and the number of OFDMA frames in a uplink OFDMA burst (Nf). The average frame overhead 1008 can be calculated as Frame_ovhd=(J/2) *Tsym, the average grant overhead 1006 can be calculated as Grant_ovhd=n*(X/2/N)*J*Tsym, the average overhead associated with the preambles 1002A-D can be calculated as Preamble_ovhd=Nf*Tpre, and the total overhead per uplink OFDMA burst 1000 can be calculated as Burst_overhead=IFG+Frame_ovhd+Grant_ovhd+Preamble_ovhd.

Figure 11:
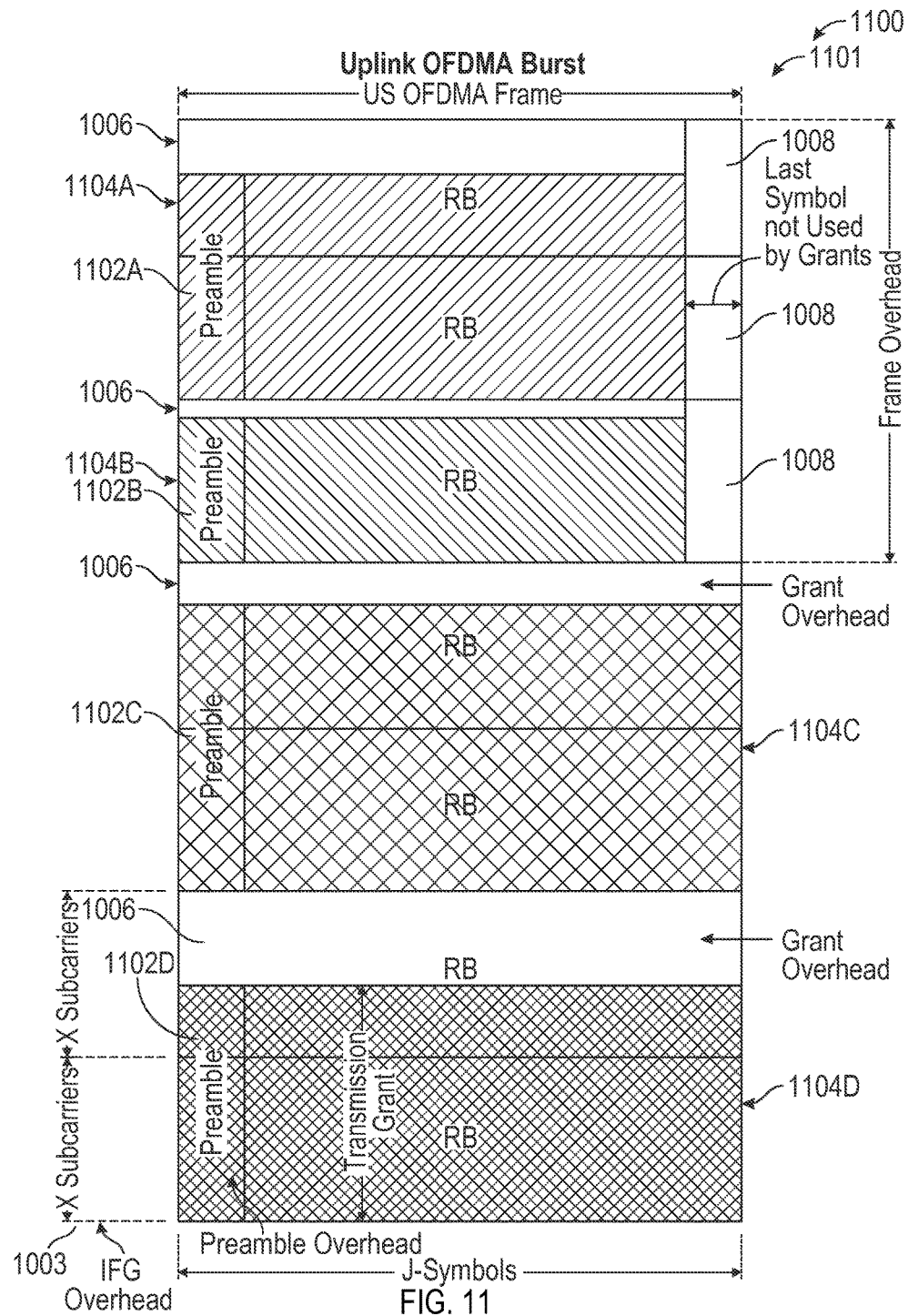
FIG. 11 illustrates an example uplink OFDMA burst with a variable OFDMA frame size in accordance with one or more implementations.

FIG. 11 illustrates an example uplink OFDMA burst 1100 with a variable OFDMA frame size in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The example uplink OFDMA burst 1100 with a variable OFDMA frame size includes a single OFDMA frame 1101, with a maximum duration of the uplink OFDMA burst 1100 being, for example, 400 microseconds. The OFDMA frame 1101 includes J OFDMA symbols and the number of subcarriers in the OFDMA frame 1101 equals the number of usable subcarriers (N) in an OFDMA symbol, such as, for example, 128 to 2048 subcarriers. The OFDMA frame 1101 is divided into resource blocks in the frequency domain, each resource block having X subcarriers and Q symbols. Each resource block may be used by one transmitter device, such as one of the devices 112A-C, 110, 114. Each resource block may include a number of resource elements, e.g. data resource elements and/or pilot resource elements. The first symbol of each resource block may be a preamble symbol that only includes pilot resource elements.

One or more of the devices 112A-C, 110, 114 that receive data grants are allocated resource blocks to transmit their data. A resource block may only be allocated to a single transmission burst. The resource blocks allocated per grant may be referred to as transmission grants. Thus, the example uplink OFDMA burst 1100 includes four transmission grants 1104A-D that each includes preamble symbols 1102A-D. For example, the transmission grant 1104A may be allocated to the device 112A, the transmission grant 1104B may be allocated to the device 112B, the transmission grant 1104C may be allocated to the device 112C, and the transmission grant 1104D may be allocated to the device 114. An example process of allocating transmission grants 1104A-D for the variable sized OFDMA frame 1101 is discussed further below with respect to FIG. 14.

The example uplink OFDMA burst 1100 may also include overhead, such as interframe gap (IFG) overhead 1003, grant overhead 1006, frame overhead 1008, and the aforementioned preambles 1002A-D. The IFG overhead 1003 occurs once each OFDMA frame 1101. The overhead associated with the preambles 1002A-D occurs once in the OFDMA frame 1101. The grant overhead 1006 occurs on every grant, which on average equals X/2 subcarriers over the number of symbols in the OFDMA frame 1101 frame (J). The frame overhead 1008 occurs once every OFDMA frame 1101, which on average equals half of a symbol size (the last symbol of the frame). In one or more implementations, the uplink OFDMA burst 1100 may include multiple OFDMA frames 1101, such as when total amount of uplink data exceeds the number of symbols that can be transmitted in a single OFDMA frame 1101, as is discussed further below with respect to FIG. 14.

Thus, the overhead (in microseconds) per uplink OFDMA burst 1100 can be calculated using the symbol duration (Tsym), the number of symbols in the OFDMA frame (J), the preamble duration (Tpre), and the number of OFDMA frames in a uplink OFDMA burst (Nf=1). The average frame overhead 1008 can be calculated as Frame_ovhd=(½) *Tsym, the average grant overhead 1006 can be calculated as Grant_ovhd=n*(X/2/N)*J*Tsym, the average overhead associated with the preambles 1102A-D can be calculated as Preamble_ovhd=Nf*Tpre, and the total overhead per uplink OFDMA burst 1100 can be calculated as Burst_overhead=IFG+Frame_ovhd+Grant_ovhd+Preamble_ovhd.

Figure 12:
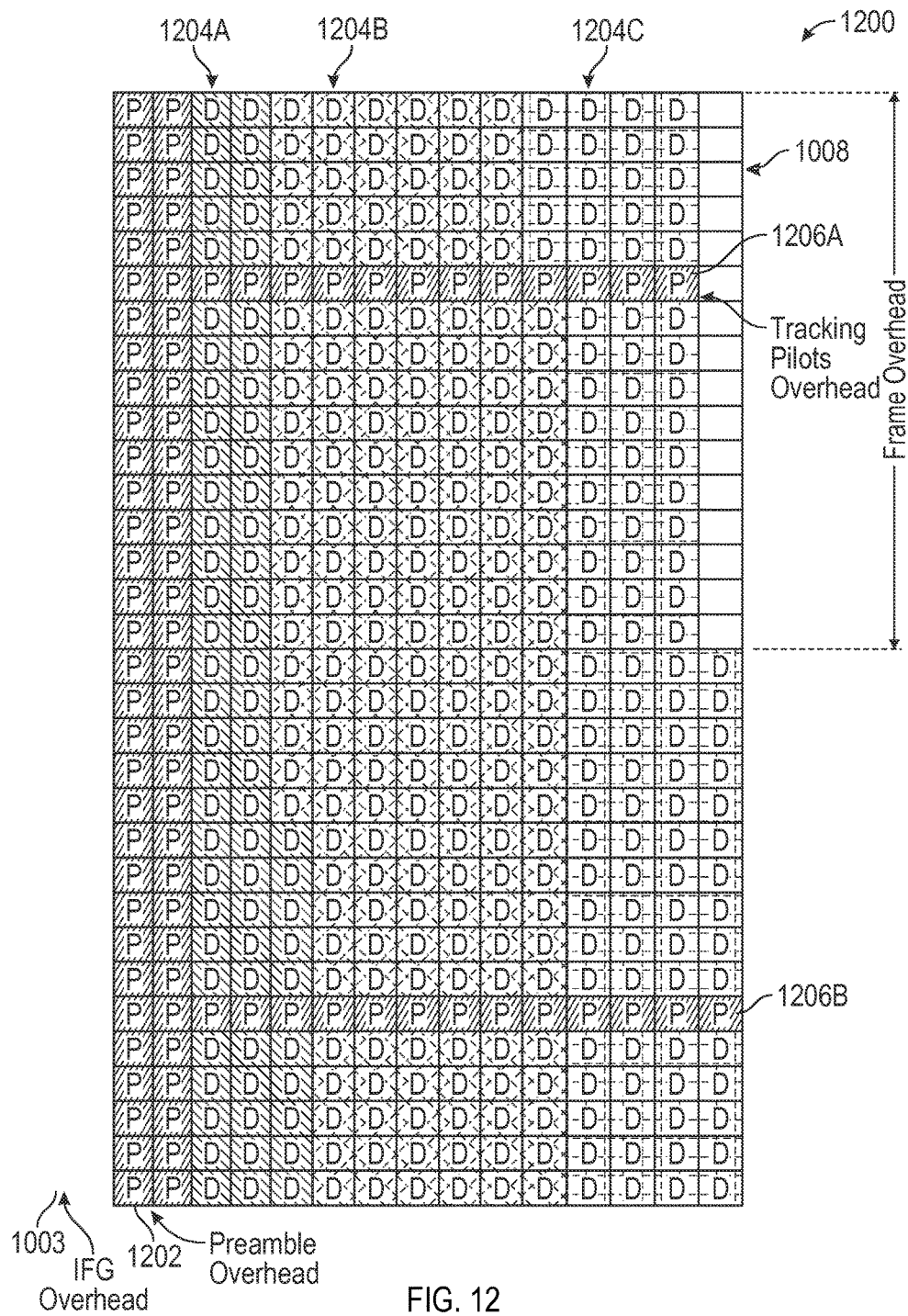
FIG. 12 illustrates an example downlink OFDMA frame in accordance with one or more implementations.

FIG. 12 illustrates an example downlink OFDMA frame 1200 in accordance with one or more implementations. Not all of the depicted components may be required; however, one or more implementations may include additional components not shown in the figure. Variations in the arrangement and type of the components may be made without departing from the scope of the claims as set forth herein. Additional components, different components, or fewer components may be provided.

The downlink OFDMA frame 1200 includes transmission grants 1204A-C, a preamble 1202, tracking pilot symbols 1206A-B, IFG overhead 1003, and frame overhead 1008. The preamble 1202 may include one or two preamble symbols per subcarrier that are used for channel estimation. The tracking pilot symbols 1206A-B, which may be continuous across given subcarriers, may be placed at every T subcarrier and may be used for frequency acquisition and tracking. The number of symbols in the downlink OFDMA frame 1200 may vary per bandwidth requests; however, the maximum duration of the downlink OFDMA frame 1200 may be, for example, 400 microseconds, or about 72 symbols including the preamble symbol(s). The transmission power and CP size may be same across all downlink OFDMA frames. The frequency and time of the downlink OFDMA frame 1200 are divided into transmission grants 1204A-C associated with data being transmitted by a transmitter device to multiple different receivers, such as the devices 112A-C, 114. Thus, the transmitter device, such as the gateway device 108, may use the appropriate bit-loading profile for each of the devices 112A-C, 114.

The downlink OFDMA frame 1200 also includes overhead, such as the IFG overhead 1003, the frame overhead 1008, overhead associated with the preamble 1202, and overhead associated with the tracking pilot symbols 1206A-B. The IFG overhead 1003 occurs once every upstream OFDMA burst. The overhead associated with the preamble 1202 occurs ones in a downlink OFDMA frame 1200. The overhead associated with the tracking pilot symbols 1206A-B occurs every number of subcarriers, such as every 128 subcarriers. The frame overhead 1008 occurs once very burst, which on average equals half of a symbol size (e.g. the last symbol of the frame).

Thus, the overhead (in microseconds) per downlink OFDMA burst can be calculated using the symbol duration (Tsym), the number of subcarriers between the tracking pilot symbols (T), the number of symbols in the downlink OFDMA frame (Nsym), the preamble duration (Tpre), and the number of OFDMA frames in a uplink OFDMA burst (Nf=1). The average frame overhead 1008 can be calculated as Frame_ovhd=(½)*Tsym, the average overhead associated with the preamble 1202 can be calculated as Preamble_ovhd=Nf*Tpre, the overhead associated with the tracking pilot symbols 1206A-B can be calculated as Pilot_ovhd=T/N*Tsym*Nsym, and the total overhead per downlink OFDMA burst can be calculated as Burst_overhead=IFG+Frame_ovhd+Pilot_ovhd+Preamble_ovhd.

Figure 13:
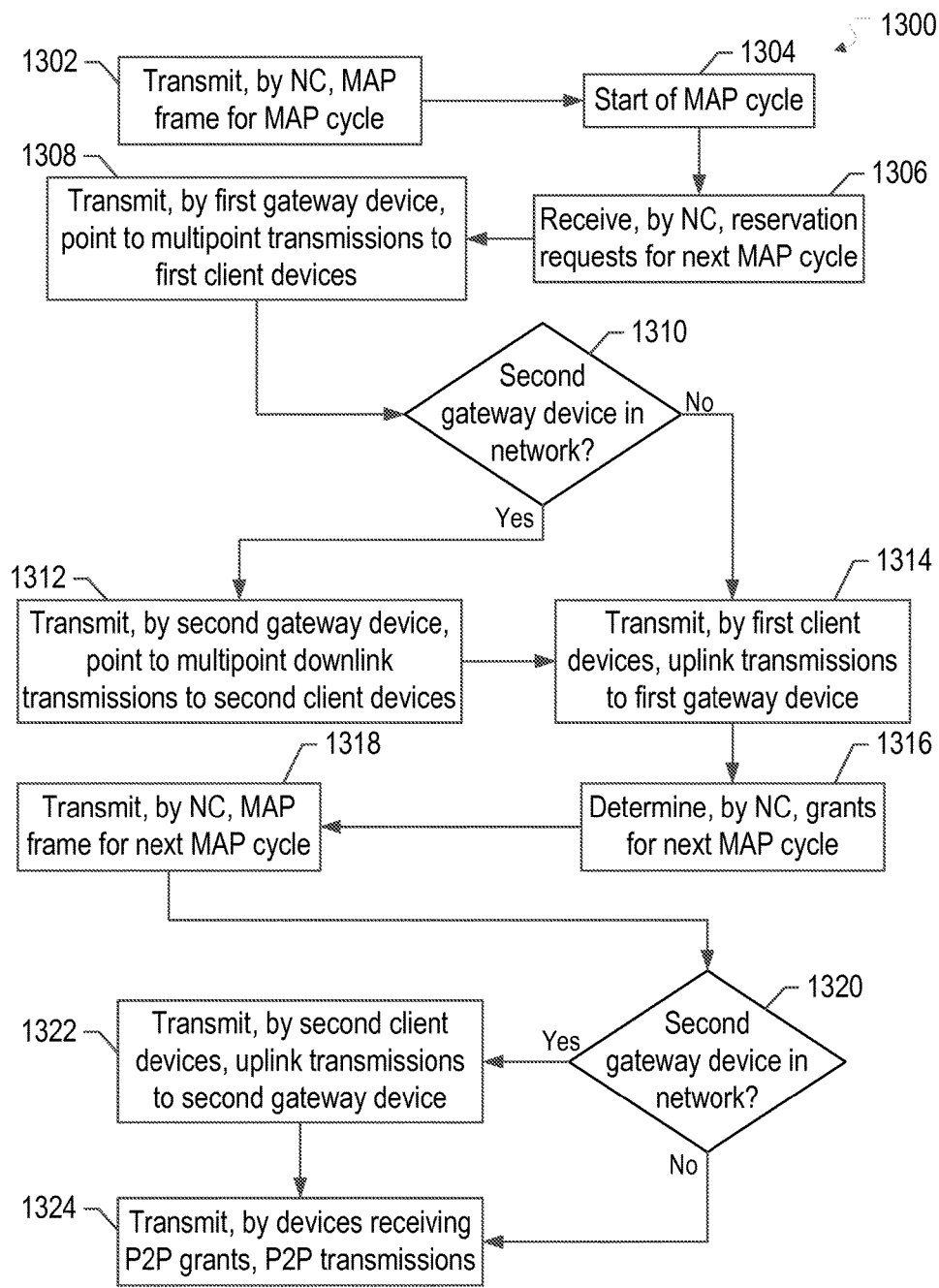
FIG. 13 illustrates a flow diagram of an example process of coordinating frequency division multiplexing transmissions in accordance with one or more implementations.

FIG. 13 illustrates a flow diagram of an example process 1300 of coordinating frequency division multiplexing transmissions in accordance with one or more implementations. For explanatory purposes, the example process 1300 is described herein with reference to the example network environment 100 of FIG. 1 and the example map cycle schedule 920 of FIG. 9; however, the example process 1300 is not limited to the example network environment 100 of FIG. 1 or the example map cycle schedule 920 of FIG. 9. Further for explanatory purposes, the blocks of the example process 1300 are described herein as occurring in serial, or linearly. However, multiple blocks of the example process 1300 may occur in parallel. In addition, the blocks of the example process 1300 need not be performed in the order shown and/or one or more of the blocks of the example process 1300 need not be performed.

The network coordinator transmits a MAP frame for the next MAP cycle (1302). For example, the network coordinator may transmits the MAP frame for the next MAP cycle during the current MAP cycle. The MAP frame may include one or more bandwidth allocations for the next MAP cycle, such as downlink point-to-multipoint transmissions, uplink transmissions, and/or peer-to-peer transmissions. As previously discussed, one or more of the devices 108, 110, 112A-C, 114 may be designated as the network coordinator for the network environment 100. The next MAP cycle starts (1304). The network coordinator receives reservation requests from one or more of the devices 108, 110, 112A-C, 114 for bandwidth allocations during the subsequent MAP cycle during the reservation request transmission periods 922A-B (1306).

A first gateway device, such as the gateway device 108, transmits point-to-multipoint transmission to its client devices 110, 112A-C, 114 during the first downlink transmission period 924A (1308). If there is a second gateway device in the network (1310), the second gateway device transmits point-to-multipoint transmissions to its client devices during the second downlink transmission period 924B (1312). The client devices associated with the first gateway device, such as the devices 110, 112A-C, 114, transmit their uplink transmissions during the first uplink transmission period 926A (1314). The network coordinator determines the transmission grants for the next MAP cycle (1316) and transmits a MAP frame for the next MAP cycle during the MAP frame transmission period 927 (1318). If there is a second gateway device in the network (1320), the second client devices transmit their uplink transmissions to the second gateway device during the second uplink transmission period 926B (1322). Lastly, any devices receiving peer-to-peer transmission grants transmit their peer-to-peer transmissions (1324).

Figure 14:
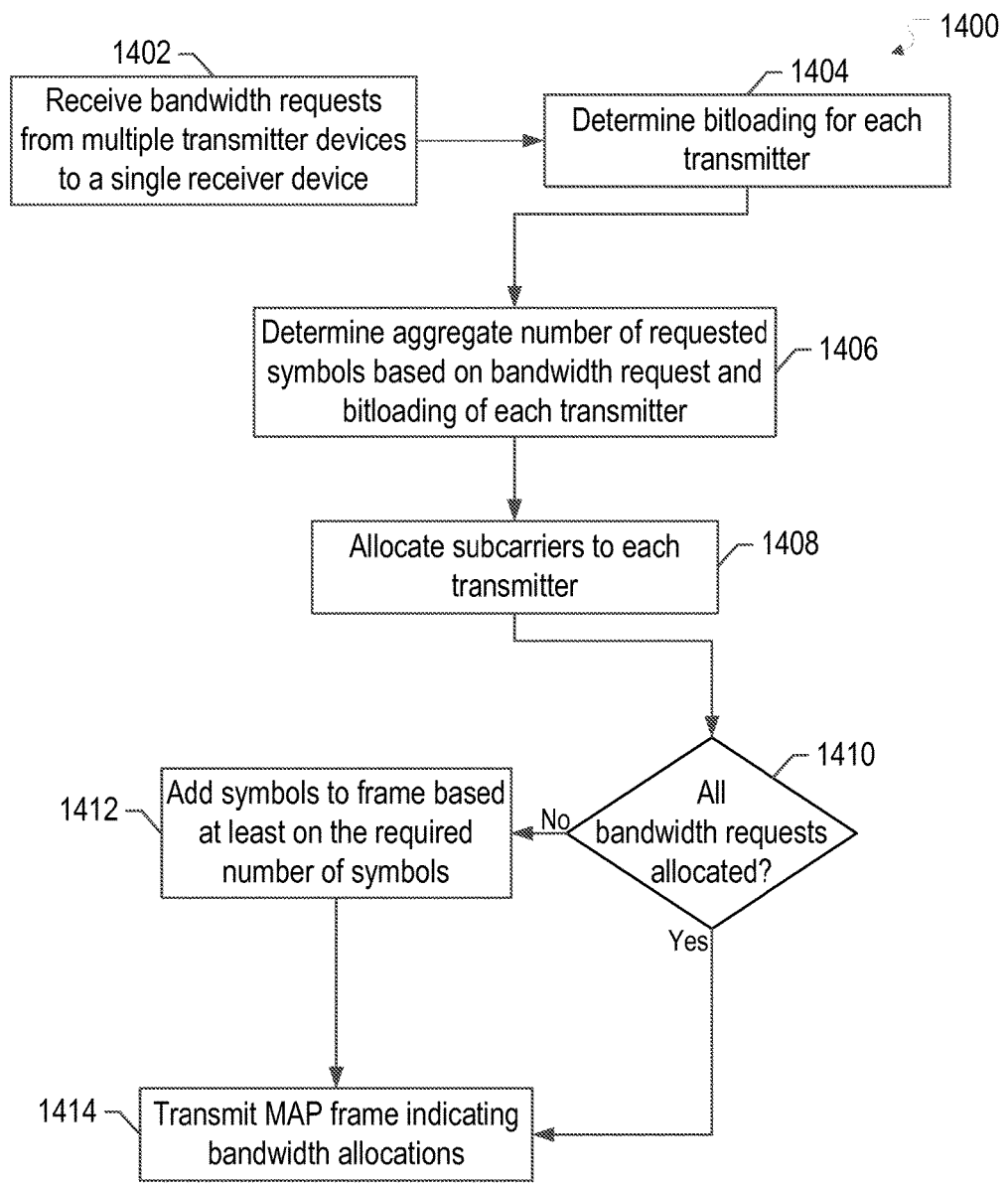
FIG. 14 illustrates a flow diagram of an example process of determining a variable frame size for an upstream burst in accordance with one or more implementations.

FIG. 14 illustrates a flow diagram of an example process 1400 of determining a variable frame size for an upstream burst in accordance with one or more implementations. For explanatory purposes, the example process 1400 is described herein with reference to the example network environment 100 of FIG. 1; however, the example process 1400 is not limited to the example network environment 100 of FIG. 1. Further for explanatory purposes, the blocks of the example process 1400 are described herein as occurring in serial, or linearly. However, multiple blocks of the example process 1400 may occur in parallel. In addition, the blocks of the example process 1400 need not be performed in the order shown and/or one or more of the blocks of the example process 1400 need not be performed.

The network coordinator receives bandwidth requests of varying data sizes (Db) from multiple transmitter devices, such as the devices 112A-C, for transmissions to a single receiver device, such as the gateway device 108 (1402). As previously discussed, one or more of the devices 108, 110, 112A-C, 114 may be designated as the network coordinator for the network environment 100. The network coordinator determines the bitloading, e.g. the number of bits per symbol (Sb), for each of the transmitter devices (1404). Since the channel conditions between each of the transmitter devices and the receiver device may differ, each of the transmitter devices may utilize a different bitloading profile for transmissions to the receiver device. The transmitter devices may periodically report to the network coordinator their bitloading profiles with respect to the receiver device.

The network coordinator determines the aggregate number of requested symbols based on the bandwidth request (Db) and bitloading (Sb) of each of the transmitter devices (1406). For example, the total number of requested symbols (Fs) may be determined as $Fs=Db_1/Sb_1+Db_2/Sb_2+ \ldots +Db_n/Sb_n$. In one or more implementations, the total number of requested symbols (Fs) may be constrained by a maximum number of symbols per OFDMA frame (M).

The network coordinator then allocates the subcarriers of the OFDMA frame to each transmitter device based on the bandwidth request (Db) and bitloading (Sb) of each transmitter device (1408). The number of subcarriers allocated to a given transmitter ($Tx_{sc}$) can be calculated as $Tx_{sc}=(Db_x/Sb_x)/Fs*N_{subcarriers}$. The network coordinator then determines whether all of the bandwidth requests could be allocated based on the calculated value of Fs (1410). Since each of the bandwidth allocations may be for differing numbers of symbols, some of the allocations may only use a portion of a given subcarrier which may result in not enough subcarriers for all of the bandwidth requests based on the initial calculation of Fs.

Accordingly, if there are not enough subcarriers for all of the bandwidth requests (1410), the network coordinator adds symbols to Fs according to the largest required number of symbols for the bandwidth allocations (1412). The network coordinator then finishes allocating the subcarriers and generates a MAP frame that indicates the bandwidth allocations as well as the final total frame size (Fs) and transmits the MAP frame to the devices 108, 110, 112A-C, 114 over the shared transmission medium 102B (1414). The devices 108, 110, 112A-C, 114 receive the MAP frame and prepare for transmitting and/or receiving data based on the frame size indicated in the MAP frame (Fs). Since the frame sizes may change from MAP cycle to MAP cycle, the devices 108, 110, 112A-C, 114 may adjust one or more frame boundaries based at least in part on the frame size indicated in the MAP frame.

Figure 15:
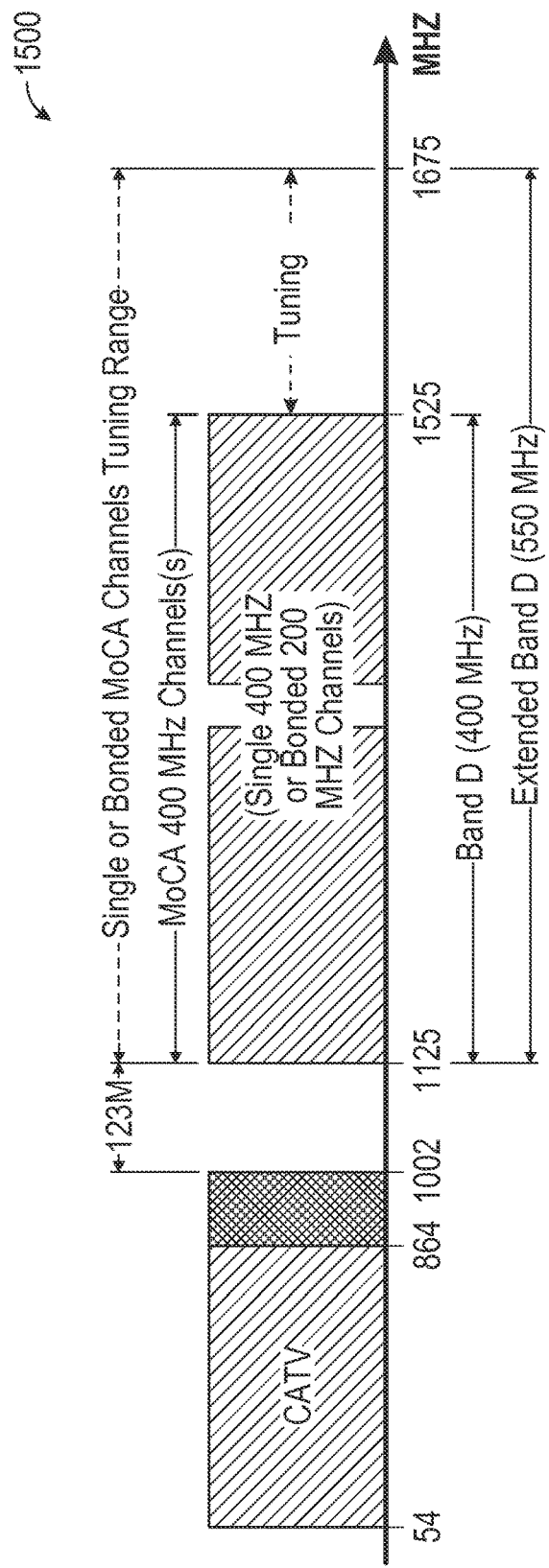
FIG. 15 illustrates an example frequency allocation in accordance with one or more implementations.

FIG. 15 illustrates an example frequency allocation 1500 in accordance with one or more implementations. The example frequency allocation 1500 illustrates a frequency allocation in band D, such as for MoCA implementations. As shown in FIG. 15, band D can accommodate a single 400 MHz channel or two bonded 200 MHz channels, and the extended band D can accommodate a single 550 MHz channel. Similar frequency allocations may be applied on, for example, the band E and/or band F.

Figure 16:
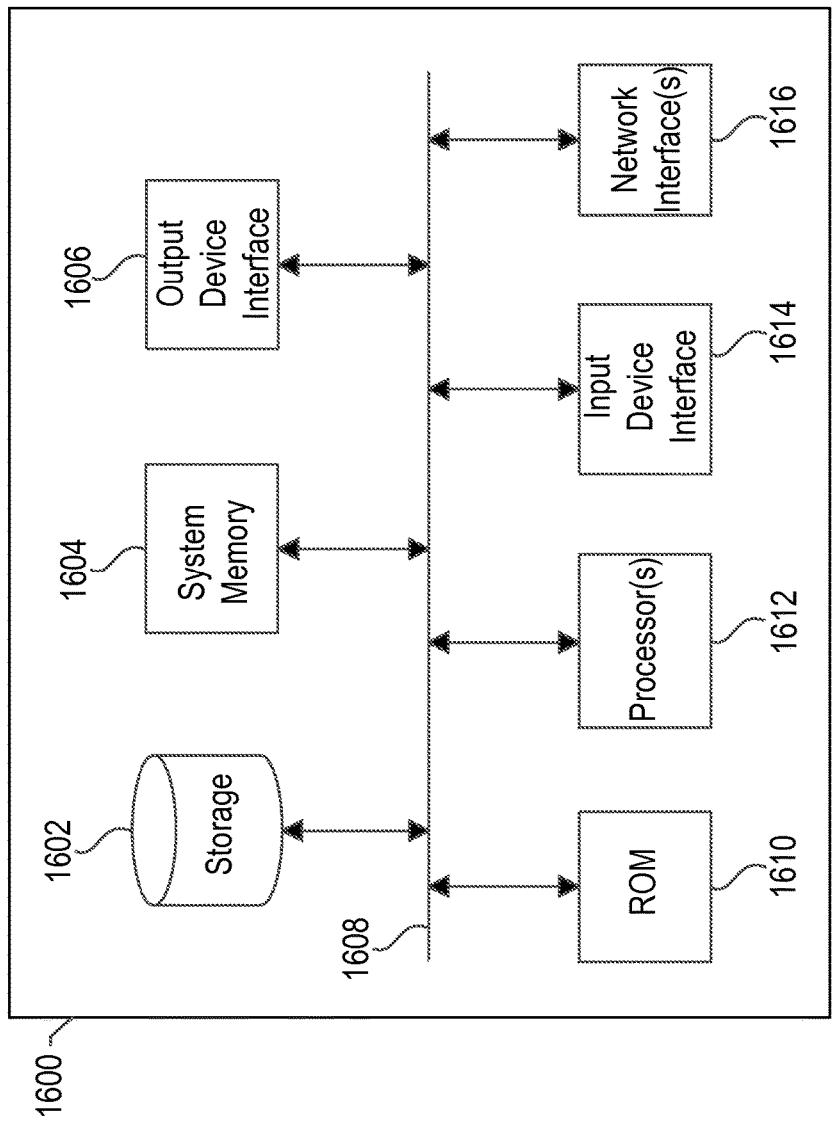
FIG. 16 conceptually illustrates an example electronic system with which one or more implementations of the subject technology can be implemented.

FIG. 16 conceptually illustrates an example of an electronic system 1600 with which one or more implementations of the subject technology can be implemented. The electronic system 1600, for example, may be, or may include, one or more of the devices 106, 108, 110, 112A-C, 114, such as a desktop computer, a laptop computer, a tablet computer, a phone, a gateway device, a set-top-box, and/or generally any electronic device. Such an electronic system 1600 includes various types of computer readable media and interfaces for various other types of computer readable media. The electronic system 1600 includes a bus 1608, one or more processing unit(s) 1612, a system memory 1604, a read-only memory (ROM) 1610, a permanent storage device 1602, an input device interface 1614, an output device interface 1606, one or more network interface(s) 1616, and/or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are utilized by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory (RAM). The system memory 1604 may store one or more of the instructions and/or data that the one or more processing unit(s) 1612 may utilize at runtime. In one or more implementations, the processes of the subject disclosure are stored in the system memory 1604, the permanent storage device 1602, and/or the ROM 1610. From these various memory units, the one or more processing unit(s) 1612 retrieve instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by the electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, such as a prism projector that may be included in a smart glasses device, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 16, bus 1608 also couples electronic system 1600 to one or more networks (not shown) through one or more network interface(s) 1616. The one or more network interface(s) may include an Ethernet interface, a WiFi interface, a Bluetooth interface, a Zigbee interface, a multimedia over coax alliance (MoCA) interface, a reduced gigabit media independent interface (RGMII), or generally any interface for connecting to a network. In this manner, electronic system 1600 can be a part of one or more networks of computers (such as a local area network (LAN), a wide area network (WAN), or an Intranet, or a network of networks, such as the Internet. Any or all components of electronic system 1600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer program product comprising instructions stored in a non-transitory computer-readable storage medium, the instructions comprising:
    instructions to receive a plurality of bandwidth requests for transmissions over a shared transmission medium during a time period, the transmissions being from a plurality of client devices to a server device;
    instructions to determine a total number of symbols associated with the plurality of bandwidth requests based at least in part on the plurality of bandwidth requests and a respective bitloading associated with each respective bandwidth request of the plurality of bandwidth requests, wherein the respective bitloading associated with each respective bandwidth request of the plurality of bandwidth requests indicates a number of bits per symbol for each respective bandwidth request of the plurality of bandwidth requests;
    instructions to determine a size of a frame associated with the plurality of bandwidth requests based at least in part on the total number of symbols;
    instructions to generate allocations of one or more portions of the frame for each respective bandwidth request of the plurality of bandwidth requests; and
    instructions to transmit, over the shared transmission medium, the size of the frame and the allocations of the one or more portions of the frame.

2. The computer program product of claim 1, wherein the instructions to generate the allocations of the one or more portions of the frame for each respective bandwidth request of the plurality of bandwidth requests further comprises: instructions to determine, for each respective bandwidth request of the plurality of bandwidth requests, a number of requested symbols based at least in part on each respective bandwidth request of the plurality of bandwidth requests and the respective bitloading associated with each respective bandwidth request of the plurality of bandwidth requests; and instructions to determine, for each respective bandwidth request of the plurality of bandwidth requests, a number of portions of the frame to provide the number of requested symbols.

3. The computer program product of claim 1, wherein the shared transmission medium comprises at least one of a coaxial transmission medium or a powerline transmission medium, and the time period comprises a medium access plan cycle.

4. The computer program product of claim 1, wherein at least one of the one or more portions comprises at least one of a subcarrier, a sub-channel, or a resource block.

5. The computer program product of claim 1, wherein the frame comprises an orthogonal frequency-division multiple access frame.

6. The computer program product of claim 1, wherein at least one of the plurality of bandwidth requests is for a peer-to-peer transmission over a plurality of channels of the shared transmission medium.

7. The computer program product of claim 6, wherein the plurality of channels are bonded at a physical coding sublayer, a physical medium attachment sublayer, or a physical medium dependent sublayer.

8. A method comprising: receiving a plurality of bandwidth requests for transmissions over a shared transmission medium during a time period, the transmissions being from a plurality of client devices to a server device;
    determining a total number of symbols associated with the plurality of bandwidth requests based at least in part on the plurality of bandwidth requests and a respective bitloading associated with each respective bandwidth request of the plurality of bandwidth requests, wherein the respective bitloading associated with each respective bandwidth request of the plurality of bandwidth requests indicates a number of bits per symbol for each respective bandwidth request of the plurality of bandwidth requests;
    determining a size of a frame associated with the plurality of bandwidth requests based at least in part on the total number of symbols;
    generating allocations of one or more portions of the frame for each respective bandwidth request of the plurality of bandwidth requests; and
    transmitting, over the shared transmission medium, the size of the frame and the allocations of the one or more portions of the frame.

9. The method of claim 8, wherein generating the allocations of the one or more portions of the frame for each respective bandwidth request of the plurality of bandwidth requests comprises:
    determining, for each respective bandwidth request of the plurality of bandwidth requests, a number of requested symbols based at least in part on each respective bandwidth request of the plurality of bandwidth requests and the respective bitloading associated with each respective bandwidth request of the plurality of bandwidth requests; and
    determining, for each respective bandwidth request of the plurality of bandwidth requests, a number of portions of the frame to provide the number of requested symbols.

10. The method of claim 8, wherein the shared transmission medium comprises at least one of a coaxial transmission medium or a powerline transmission medium, and the time period comprises a medium access plan cycle.

11. The method of claim 8, wherein at least one of the one or more portions comprises at least one of a subcarrier, a sub-channel, or a resource block.

12. The method of claim 8, wherein the frame comprises an orthogonal frequency-division multiple access frame.

13. The method of claim 8, wherein at least one of the plurality of bandwidth requests is for a peer-to-peer transmission over a plurality of channels of the shared transmission medium.

14. The method of claim 13, wherein the plurality of channels are bonded at a physical coding sublayer, a physical medium attachment sublayer, or a physical medium dependent sublayer.

15. A device comprising: a memory; and at least one processor configured to: receive a plurality of bandwidth requests for transmissions over a shared transmission medium during a time period, the transmissions being from a plurality of client devices to a server device; determine a total number of symbols associated with the plurality of bandwidth requests based at least in part on the plurality of bandwidth requests and a respective bitloading associated with each respective bandwidth request of the plurality of bandwidth requests, wherein the respective bitloading associated with each respective bandwidth request of the plurality of bandwidth requests indicates a number of bits per symbol for each respective bandwidth request of the plurality of bandwidth requests; determine a size of a frame associated with the plurality of bandwidth requests based at least in part on the total number of symbols; generate allocations of one or more portions of the frame for each respective bandwidth request of the plurality of bandwidth requests; and transmit, over the shared transmission medium, the size of the frame and the allocations of the one or more portions of the frame.

16. The device of claim 15, wherein the shared transmission medium comprises at least one of a coaxial transmission medium or a powerline transmission medium, and the time period comprises a medium access plan cycle.

17. The device of claim 15, wherein at least one of the one or more portions comprises at least one of a subcarrier, a sub-channel, or a resource block.

18. The device of claim 15, wherein the frame comprises an orthogonal frequency-division multiple access frame.

19. The device of claim 15, wherein at least one of the plurality of bandwidth requests is for a peer-to-peer transmission over a plurality of channels of the shared transmission medium.

20. The device of claim 19, wherein the plurality of channels are bonded at a physical coding sublayer, a physical medium attachment sublayer, or a physical medium dependent sublayer.

* * * * *